(12) United States Patent
Anderson

(10) Patent No.: US 11,815,016 B2
(45) Date of Patent: Nov. 14, 2023

(54) THERMAL STORAGE AND POWER GENERATION SYSTEMS AND METHODS FOR ELECTRICAL POWER SOURCE MANAGEMENT

(71) Applicant: 247Solar Inc., Great Falls, VA (US)

(72) Inventor: Bruce N. Anderson, Great Falls, VA (US)

(73) Assignee: 247Solar Inc., Great Falls, VA (US)

( * ) Notice: Subject to any disclaimer, the term of this patent is extended or adjusted under 35 U.S.C. 154(b) by 0 days.

(21) Appl. No.: 17/698,877

(22) Filed: Mar. 18, 2022

(65) Prior Publication Data
US 2022/0298966 A1    Sep. 22, 2022

Related U.S. Application Data

(60) Provisional application No. 63/163,776, filed on Mar. 19, 2021.

(51) Int. Cl.
*F02C 6/16* (2006.01)
*F28D 20/00* (2006.01)

(52) U.S. Cl.
CPC ............... *F02C 6/16* (2013.01); *F28D 20/00* (2013.01); *F28D 2020/006* (2013.01); *F28D 2020/0069* (2013.01); *F28D 2020/0078* (2013.01)

(58) Field of Classification Search
CPC ... F01K 3/02; F01K 3/08; F01K 3/186; F01K 15/00; H02M 1/007; F28D 20/00;
(Continued)

(56) References Cited

U.S. PATENT DOCUMENTS

| 5,259,444 | A |   | 11/1993 | Wilson |
| 5,384,489 | A | * | 1/1995 | Bellac .................. F03D 9/18 |
|           |   |   |         | 60/659 |

(Continued)

FOREIGN PATENT DOCUMENTS

| WO | WO 2012/037532 A2 | 3/2012 |
| WO | WO 2013/142275 A2 | 9/2013 |

(Continued)

OTHER PUBLICATIONS

International Search Report and Written Opinion for International Application No. PCT/US2022/021001 dated Aug. 29, 2022.
(Continued)

*Primary Examiner* — Shafiq Mian
(74) *Attorney, Agent, or Firm* — Wolf, Greenfield & Sacks, P.C.

(57) ABSTRACT

Thermal battery systems for management (e.g., load management) of electrical power sources, and related methods, are generally described. Thermal battery systems in certain embodiments have an electric heater, a thermal storage system, a heat exchange system and an electricity generator. The electric heater is configured to be connected in electrical communication with an electric power source, such as an electric power grid and to heat the thermal storage system. The electric heater may be a separate unit from the thermal storage system and heat the thermal storage system indirectly by heating a first fluid that is circulated through the thermal storage system during charging, or the electric heater may be integrated directly into the thermal storage system to heat it directly. The thermal storage system is configured to store thermal energy from the electric heater during a charging mode of the thermal storage system, and to heat the first fluid, which is then supplied to a heat exchange system during a discharging mode of the thermal storage system. The heat exchange system comprises at least
(Continued)

one heat exchanger, and in some cases, at least a first and a second heat exchanger connected in series. The heat exchange system is positioned downstream from the thermal storage system and is configured to transfer heat from the heated first fluid to a second compressed fluid. The electricity generator may comprise at least one gas turbine and compressor. The compressor is configured to supply the second compressed fluid to the heat exchange system. The turbine is positioned with an inlet in fluid communication with and downstream from the heat exchange system so that the heated compressed second fluid is discharged from an outlet of the heat exchange system into the inlet of the turbine so that the turbine is able to generate electrical power therefrom. The power generated can be returned to the electrical power source, e.g., an electrical power grid.

18 Claims, 9 Drawing Sheets

(58) Field of Classification Search
CPC ....... F28D 2020/006; F28D 2020/0069; F28D 2020/0078; H01M 8/04014; H01M 8/04029; H01M 8/04037; H01M 8/04052; H01M 8/04074; F02C 6/16
See application file for complete search history.

(56) References Cited

U.S. PATENT DOCUMENTS

| | | | |
|---|---|---|---|
| RE37,134 E | 4/2001 | Wilson | |
| 6,681,557 B2 | 1/2004 | Wilson | |
| 9,726,155 B2 | 8/2017 | Anderson et al. | |
| 10,876,521 B2* | 12/2020 | Anderson | F24S 10/70 |
| 10,907,510 B2* | 2/2021 | Larochelle | F01K 3/12 |
| 10,907,513 B2* | 2/2021 | Laughlin | F01K 5/00 |
| 2002/0124991 A1 | 9/2002 | Wilson | |
| 2004/0148922 A1* | 8/2004 | Pinkerton | F02C 7/08 |
| | | | 60/670 |
| 2006/0054301 A1 | 3/2006 | McRay et al. | |
| 2007/0089283 A1 | 4/2007 | Wilson et al. | |
| 2007/0220889 A1* | 9/2007 | Nayef | F03D 9/255 |
| | | | 60/659 |
| 2008/0251234 A1 | 10/2008 | Wilson et al. | |
| 2009/0000761 A1 | 1/2009 | Wilson et al. | |
| 2009/0000762 A1 | 1/2009 | Wilson et al. | |
| 2014/0366536 A1* | 12/2014 | Muren | F03G 6/00 |
| | | | 126/618 |
| 2017/0159500 A1* | 6/2017 | Laughlin | F01K 3/20 |

FOREIGN PATENT DOCUMENTS

| | | | |
|---|---|---|---|
| WO | WO 2014/052927 A1 | 4/2014 | |
| WO | WO 2015/185891 A1 | 12/2015 | |
| WO | WO 2015/187423 A2 | 12/2015 | |
| WO | WO 2021/202939 A2 | 10/2021 | |

OTHER PUBLICATIONS

Spector, So, What Exactly is Long-Duration Energy Storage? Greentech Media. Oct. 26, 2020. https://www.greentechmedia.com/articles/read/so-what-exactly-is-long-duration-storage-explained?utm_medium=email&utm_source=Daily&utm_campaign=GTMDaily [last accessed Jul. 7, 2022].

* cited by examiner

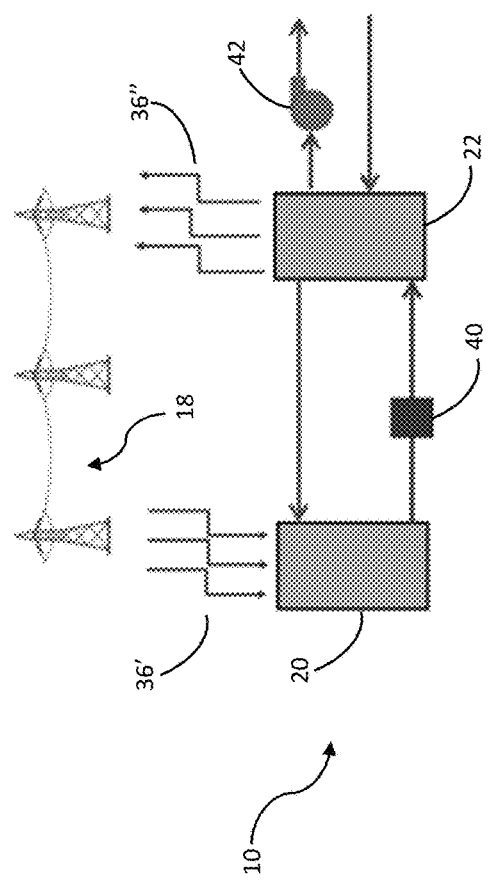
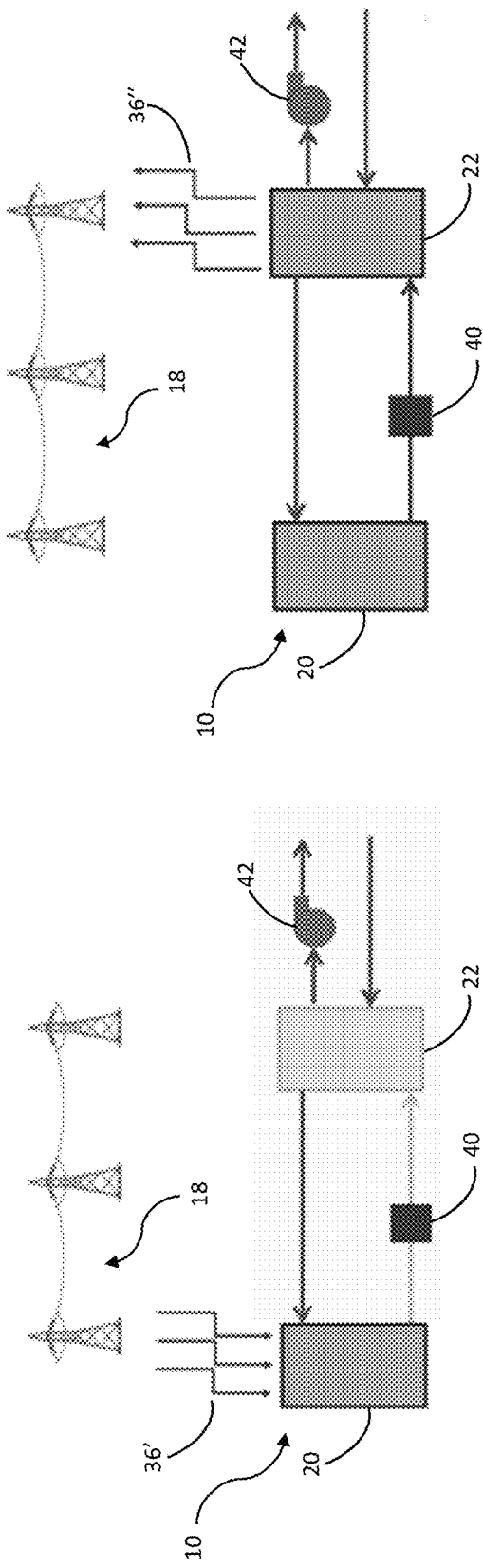

THERMAL STORAGE AND POWER GENERATION SYSTEMS AND METHODS FOR ELECTRICAL POWER SOURCE MANAGEMENT

RELATED APPLICATIONS

This application claims priority under 35 U.S.C. § 119(e) to U.S. Provisional Patent Application Ser. No. 63/163,776, filed Mar. 19, 2021, and entitled "Thermal Storage and Power Generation Systems and Methods for Electrical Grid Load Management", which is incorporated herein by reference in its entirety for all purposes.

FIELD OF INVENTION

Thermal battery systems for management of electrical power sources, and related methods, are generally described.

BACKGROUND

The electric power grid operates on a balance between supply and demand depending on consumer usage. Electrical energy storage may be used to help balance fluctuations in electricity supply and demand. Hydroelectric storage, such as pumped-storage hydroelectricity (PSH), is known for such a purpose. PSH, for example, can be used for load balancing to store energy in the form of gravitational potential energy of water. In order to operate, however, PSH requires a specialized site that needs both geographical height and water availability. Accordingly, advances in energy storage systems for applications like grid load management such as those described below would be beneficial.

SUMMARY OF THE INVENTION

Thermal battery systems for electrical grid load management, and related methods, are generally described.

According to some embodiments, a thermal battery system is described, the thermal battery comprising an electric heater, a thermal storage system, a heat exchange system, and an electricity generator. In some embodiments, the electric heater is configured to be connected in electrical communication with an electric power source, and wherein the electric heater is configured to heat the thermal storage system. In certain embodiments, the thermal storage system is configured to store thermal energy from the electric heater during a charging mode of the thermal storage system, and heat a first fluid and provide the heated first fluid to the heat exchange system during a discharging mode of the thermal storage system. In some embodiments, the heat exchange system comprises at least a first heat exchanger and a second heat exchanger connected in series, wherein the heat exchange system is positioned downstream from the thermal storage system, and wherein the heat exchange system is configured to transfer heat from the heated first fluid to a second fluid to produce a heated second fluid. In certain embodiments, the electricity generator comprises at least one gas turbine and compressor, wherein the compressor is configured to supply the second fluid in a pressurized state to an inlet of the second heat exchanger, and wherein the turbine is positioned with an inlet in fluid communication with and downstream from an outlet of the first heat exchanger such that the heated second fluid in a pressurized state is discharged from an outlet of the second heat exchanger into an inlet of the first heat exchanger and discharged from the outlet of the first heat exchanger into the inlet of the turbine so that the turbine is able to generate electrical power therefrom.

According to certain embodiments, a thermal battery system is described, the thermal battery system comprising an electric heater, a thermal storage system, and an electrical power production system. In some embodiments, the electric heater is configured to be connected in electrical communication with an electric power source, and wherein the electric heater is configured to heat the thermal storage system. In certain embodiments, the thermal storage system is configured to store thermal energy from the electric heater during a charging mode of the thermal storage system, and supply heat energy to power the electrical power production system during a discharging mode of the thermal storage system.

According to some embodiments, a method of converting and storing electrical energy as thermal energy is described, the method comprising drawing electrical power from an electrical power source, storing the electrical power as thermal energy, generating electrical power from the stored thermal energy, and delivering the generated electrical power to the electrical power source. In certain embodiments, the drawing, storing, generating, and delivering are performed utilizing a thermal battery system.

According to certain embodiments, a steam power plant is described, the steam power plant comprising a steam-powered electrical generation system comprising a steam boiler for producing pressurized steam and a steam turbine driven by the pressurized steam to produce electrical power, and a plurality of thermal battery systems configured to supply thermal energy to the steam boiler to produce the pressurized steam.

According to some embodiments, a thermal battery system is described, the thermal battery system comprising: a heat exchange system comprising at least a first heat exchange unit and a second heat exchange unit configured in series, the heat exchange system positioned downstream of an electric heater in electrical communication with an electric power source, wherein the heat exchange system is configured to transfer heat from a first fluid heated by the electric heater to a second fluid to produce a heated second fluid; a thermal storage system in switchable valved fluidic communication with both the electric heater and the heat exchange system, the thermal storage system configured to receive the first fluid heated by the electric heater, store thermal energy from the first fluid heated by the electric heater by heating a thermal storage medium contained within the thermal storage system during a charging mode of the thermal storage system, and heating the first fluid and providing the heated first fluid to the heat exchange system during a discharging mode of the thermal storage system; and an electricity generator comprising a gas turbine and compressor, the compressor configured to supply the second fluid in a pressurized state to an inlet of the heat exchange system, and the turbine being positioned with an inlet in fluid communication with and downstream of an outlet of the heat exchange system discharging the second fluid in a pressurized state to the inlet of the turbine so that the turbine is able to generate electrical power therefrom.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures:

FIG. 1A shows, according to some embodiments, a schematic diagram of an overview of the components and operation of a thermal battery system;

FIG. 1B shows, according to some embodiments, a schematic diagram of the thermal battery system of FIG. 1A during charging;

FIG. 1C shows, according to some embodiments, a schematic diagram of the thermal battery system of FIG. 1A during discharging and power generation;

DETAILED DESCRIPTION

Figure 2A:
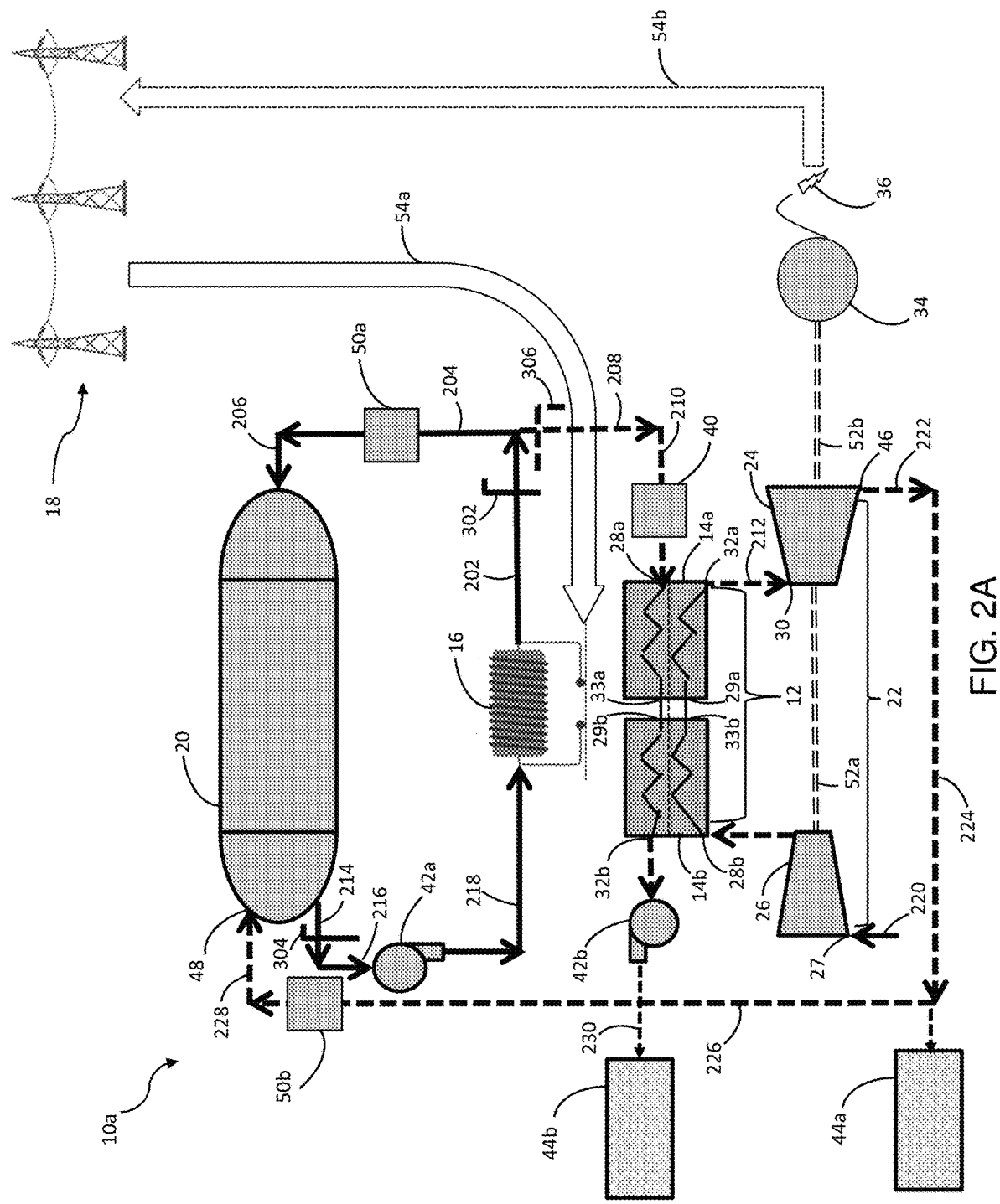
FIG. 2A shows, according to some embodiments, a schematic diagram of the components of a thermal battery system and their state of operation during charging.

Thermal battery systems for management of electrical power sources, and related methods, are described. The thermal battery systems may be configured to convert excess power produced by an electrical power source (e.g., an electrical power grid) to thermal energy by heating a thermal storage system to temperatures up to 1300° C., 1500° C., 1700° C., 2000° C., or more in some cases. After conversion of the electrical energy to thermal energy, the thermal battery system may store the thermal energy (e.g., in the thermal storage system) for desired periods of time as appropriate for managing high/low demand/supply periods for an electrical power grid or other electrical power source. The stored thermal energy may then be used to generate electrical energy, which can be delivered back to the electrical power source, as needed. Such thermal battery systems may be employed at any of a variety of suitable locations where it is desirable to store thermal energy and convert it to power, for example, during high consumer demand periods.

The thermal battery system is therefore configured such that electrical power may be drawn from the electrical power source and stored as thermal energy in the thermal battery system during low-demand periods (i.e., periods when an amount of electrical power supplied to the electrical power source exceeds an amount of demand for electrical power from the electrical power source), and the electrical power may be generated and delivered to the electrical power source during high-demand periods (i.e., periods when an amount of electrical power supplied to the electrical power grid is insufficient to meet user demands).

In some embodiments, the thermal battery system comprises an electric heater, a thermal storage system, a heat exchange system, and an electrical power production system. The electric heater is connected in electrical communication with an electric power source and may be configured to heat a gas or other fluid, such as a low-pressure (e.g., ambient pressure) fluid. During a charging mode, the thermal storage system is configured, in some embodiments, to store thermal energy derived from the fluid heated by the electric heater. During a discharging mode, the thermal storage system is configured to heat the fluid (e.g., low-pressure fluid), which may be circulated to a heat exchange system. The heat exchange system may be configured, in some embodiments to transfer heat from the fluid heated by the thermal storage system to a compressed fluid (e.g., a gas such as air), thereby producing a heated, higher-pressure fluid. The electrical power production system is configured to receive the heated, compressed fluid and generate electrical power therefrom, e.g., via an expansion turbine.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIGS. 1A-1C show an overview of a thermal battery system, according to certain embodiments. FIG. 1B shows the thermal battery system during charging, and FIG. 1C shows the thermal battery system during discharging and power generation. Referring to FIGS. 1A-1C, thermal battery system 10 comprises thermal storage system 20 and electricity generator 22. Referring to FIG. 1B, thermal battery system 10 is configured to draw electrical energy 36' from electrical power source 18 (e.g., electrical power grid), convert electrical energy 36' to thermal energy (e.g., using an electric heater), and store the thermal energy in thermal storage system 20. Referring to FIG. 1C, thermal battery system 10 is configured to generate electrical power 36" from the stored thermal energy using, for example, electricity generator 22. In some embodiments, electrical power 36b" is delivered back to electrical power source 18. In certain embodiments, and as shown in FIGS. 1A-1C, thermal battery system 10 may comprise an optional non-electric heater to supplement the electric heater, for example combustor 40 and/or a solar receiver. Combustor 40 may be configured to provide supplemental heating of the fluid flowed from thermal storage system 20 to electricity generator 22. Configuring the thermal battery system in this way advantageously provides a system that is capable of delivering electrical power to the electrical power source substantially anytime, even when the thermal storage system has been fully discharged. Thermal battery system 10 may also include at least one blower 42 for circulating the working fluid heated by the electric heater and/or thermal storage system of the thermal battery system. The various unit operations and configurations of exemplary embodiments of the thermal battery system are described in greater detail below.

Figure 2B:
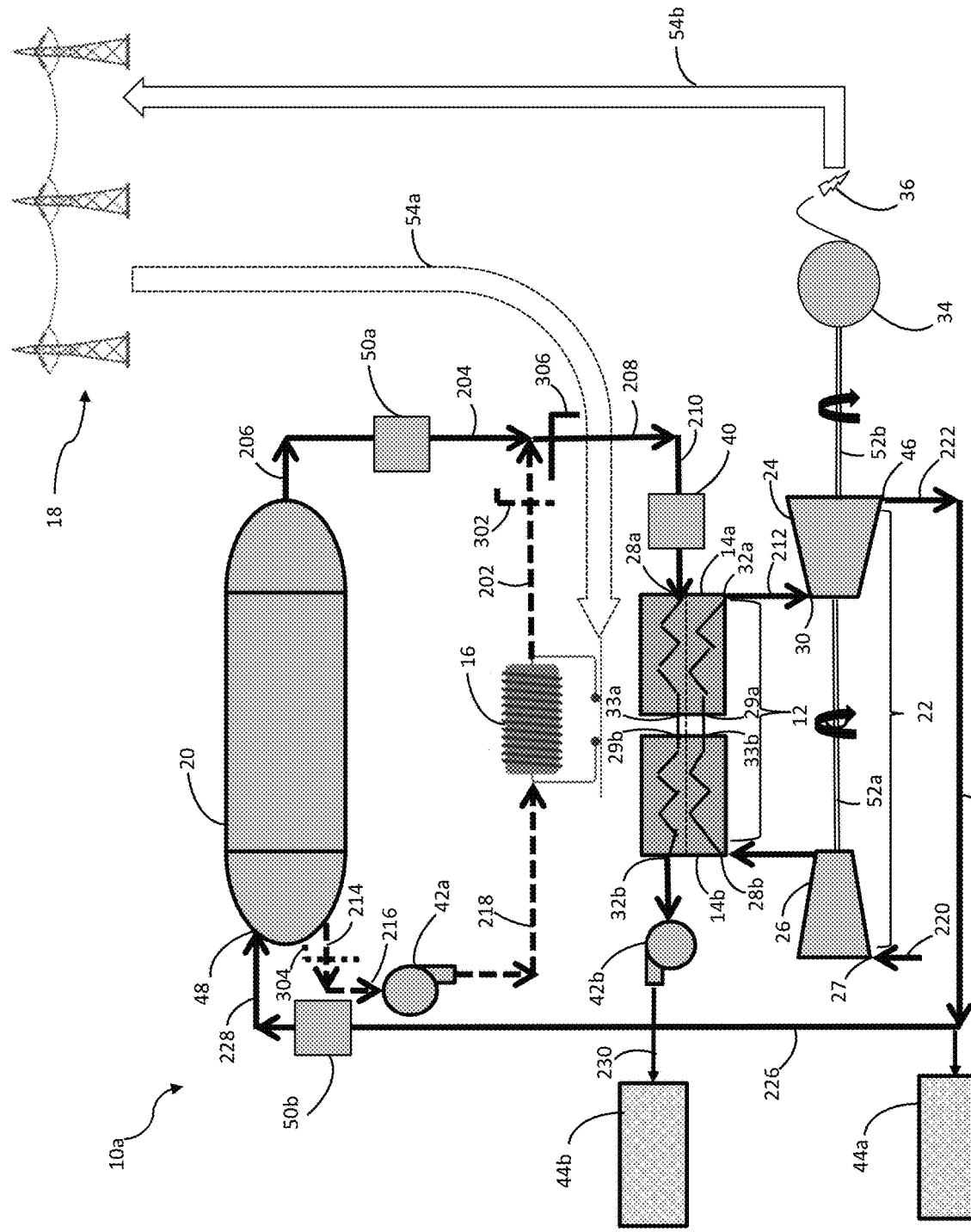
FIG. 2B shows, according to some embodiments, a schematic diagram of the components of a thermal battery system and their state of operation during discharging.

FIGS. 2A and 2B show, according to some embodiments, schematic diagrams of the components of a thermal battery system during charging and discharging, respectively. Active (open) fluid streams in the figures (i.e., those containing a flowing working fluid) are illustrated with solid lines, such as, for example, streams 202 and 204 in FIG. 2A. Inactive (closed) fluid streams in the figures (i.e., those with no circulation of working fluid) are illustrated with dotted lines, such as, for example, streams 208 and 210 in FIG. 2A.

Electric Heater

In some embodiments, the thermal battery system comprises an electric heater for converting electrical energy to thermal energy that can be stored by the thermal storage system. Referring, for example, to FIGS. 2A and 2B, thermal battery system 10a comprises electric heater 16.

Figure 6:
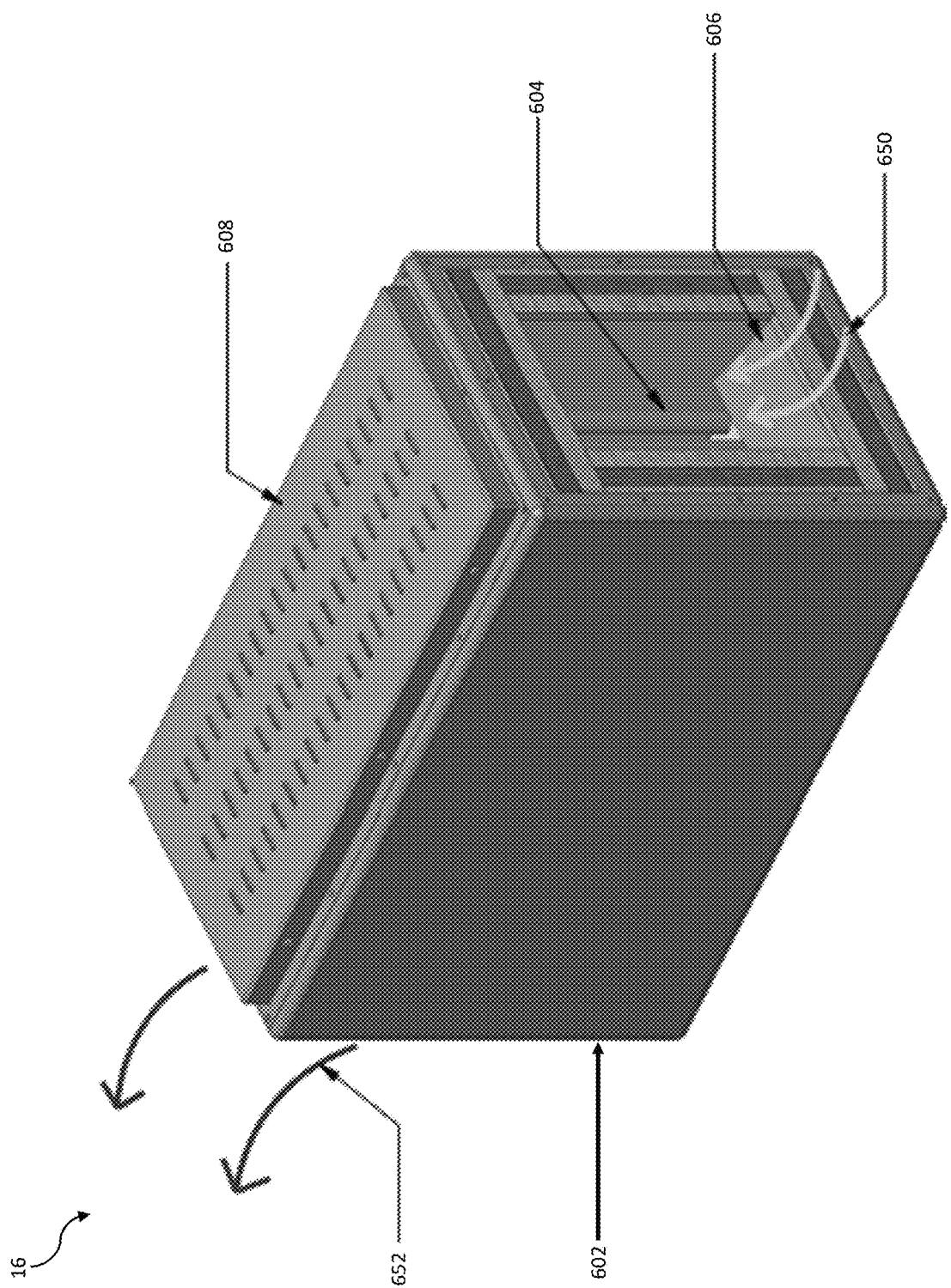
FIG. 6 shows a schematic diagram of an electric heater, according to some embodiments.

Electric heater 16 may have any of a variety of suitable configurations. FIG. 6 shows, according to some embodiments, a schematic diagram of an exemplary electric heater 16. In certain embodiments, for example, electric heater 16 comprises one or more heating elements 604, which may be of any suitable type, such as but not limited to an infrared (IR) radiative type and/or a resistance type. In certain embodiments, heating element 604 may comprise a radiant tube (e.g., an IR transparent radiant tube), a wire, a strip or ribbon, a coil, and/or an element of other geometry or configuration, any of which may optionally be coated with and/or encased in an electrically insulating material, such as a ceramic. Heating element 604 may, in some embodiments, comprise one or more metals and/or alloys able to withstand operating temperatures (e.g., tungsten, platinum, nickel, chromium, iron, aluminum, copper, titanium, molybdenum, tantalum, columbium, stainless steels, and/or high-temperature alloys). Examples of high temperature alloys include Nichrome—an alloy of 80% nickel and 20% chromium, Kanthal (e.g., FeCrAl, such as, FeCrAl 125 and/or FeCrAl 135), Cupronickel (CuNi)), and/or the like. Other metals and/or alloys are also possible. In certain embodiments, heating element 604 comprises quartz, a ceramic, and/or a semiconductor (e.g., silicon dioxide, molybdenum disilicide, silicon carbide, silicon nitride, and/or the like). Other suitable ceramics and/or semiconductors and high-temperature materials can be used.

The one or more heating elements may have any of a variety of suitable configurations. In certain embodiments, for example, electric heater 16 is in the form of a duct or portion of a duct that comprises an array of heating elements, wherein each heating element 604 is configured substantially perpendicular to the flow of fluid through electric heater 16. As shown in FIG. 6, for example, heating element 604 is configured substantially perpendicular to fluid flow-in 650 and fluid flow-out 652 of electric heater 16. Electric heater 16 may, in some embodiments, comprise fluid plate 606 to direct the flow of fluid through one or more heating elements of electric heater 16. Other configurations are also possible, however, including embodiments in which the one or more heating elements are configured substantially parallel to the flow of fluid through electric heater 16 or are placed within the thermal storage system vessel in addition to or as an alternative of providing a separate flow-through electric heater 16.

The electric heater may comprise one or more thermal and/or electrical insulating materials. Examples of suitable insulating materials include, but are not limited to glass, fiberglass, ceramic (e.g., firebrick and/or fireclay), ceramic fiber, mineral wool, mica, microporous silica, and/or the like.

In some embodiments, the electric heater may comprise an internal and/or external casing/housing and/or cover that contains the one or more resistance heating elements and the one or more insulating materials. As shown in FIG. 6, for example, electric heater 16 comprises housing 602 and cover 608.

Electric heaters and/or heating elements are known, and one of ordinary skill in the art would be capable of selecting or constructing an appropriate electric heater to use, given a desired temperature and heat production requirements. Certain electric heaters and/or heating elements that are commercially available and/or custom manufacturable from suppliers such as Durex Industries, Micropyretics Heaters International Inc., Kanthal Corporation, Watlow Electric Manufacturing Co., Delta T, and/or Tempsens Instruments may be suitable for use in or as electric heater 16 and/or to heat the contents of thermal storage system 20, and the disclosure is not meant to be limiting in this regard.

Electric heater 16 is configured to be connected and, during operation, is connected in electrical communication with electric power source 18, for example, via power and/or transmission line 54a.

Any of a variety of suitable electric power sources may be employed. In some embodiments, for example, the electric power source is an electrical power grid. In certain embodiments, the electrical power source is a power source with an intermittent output, such as a photovoltaic system, a concentrated solar power system, and/or a wind power system. Other electric power sources are also possible, however, as the disclosure is not meant to be limiting in this regard.

The electric heater is configured to heat the thermal storage system. Referring to FIG. 2A, for example, electric heater 16 is configured to heat thermal storage system 20. In certain embodiments, electric heater 16 is configured to heat thermal storage system 20 indirectly (e.g., as illustrated) by heating a first fluid that is delivered to thermal storage system 20 (e.g., via streams 202, 204, and 206) and circulated through both the electric heater and the thermal storage system during charging (e.g., FIG. 2A mode). As illustrated and described further below, thermal storage system 20 receives the heated first fluid from electric heater 16 and stores thermal energy from the heated first fluid during the charging mode of thermal storage system 20.

According to certain embodiments, and as shown in FIGS. 2A and 2B, electric heater 16 is a distinct unit operation physically separate from thermal storage system 20. In certain embodiments, however, the electric heater may be integrated with and/or within the thermal storage system itself such that the thermal storage system and its contents are heated directly by the electric heater. In some embodiments, both a separate electric heater and a thermal storage system with an integrated electric heater or heating element may be used together. In certain embodiments with an electric heater or heating element integrated into and directly heating the thermal storage system, the electric or heating element may be contained and/or embedded within one or more vessels defining the thermal storage system, or at least partially wrapped around and/or otherwise intertwined with such one or more vessels of the thermal storage system. Other configurations are also possible, as the disclosure is not meant to be limiting in this regard.

The first fluid heated by the electric heater may have any of a variety of suitable pressures. In certain embodiments, for example, the first fluid heated by the electric heater has a pressure less than or equal to 2 atmospheres, less than or equal to 1.9 atmospheres, less than or equal to 1.8 atmospheres, less than or equal to 1.7 atmospheres, less than or equal to 1.6 atmospheres, less than or equal to 1.5 atmospheres, less than or equal to 1.4 atmospheres, less than or equal to 1.3 atmospheres, less than or equal to 1.2 atmospheres, less than or equal to 1.1 atmospheres, less than or equal to 1 atmosphere, less than or equal to 0.9 atmospheres, less than or equal to 0.8 atmospheres, less than or equal to 0.7 atmospheres, less than or equal to 0.6 atmospheres, or less. In certain embodiments, the first fluid heated by the electric heater has a pressure between 2 atmospheres and 0.5 atmospheres, or between 1.1 atmospheres and 0.9 atmospheres. Other ranges and values are also possible. In certain non-limiting embodiments, the first fluid is at ambient pressure.

Unless otherwise indicated, all pressures described herein refer to absolute pressures.

The first fluid heated by the electric heater may have any of a variety of suitable temperatures. In some embodiments, for example, the electric heater is able to heat the first fluid to a temperature greater than or equal to 600° C., greater than or equal to 650° C., greater than or equal to 700° C., greater than or equal to 750° C., greater than or equal to 800° C., greater than or equal to 850° C., greater than or equal to 900° C., greater than or equal to 950° C., greater than or equal to 1000° C., greater than or equal to 1050° C., greater than or equal to 1100° C., greater than or equal to 1150° C., greater than or equal to 1200° C., greater than or equal to 1250° C., greater than or equal to 1300° C., greater than or equal to 1500° C., greater than or equal to 1700° C., greater than or equal to 1900° C., or greater than or equal to 2000° C. In certain embodiments, the electric heater is able to heat the first fluid to between 600° C. and 2000° C., between 600° C. and 1700° C., between 600° C. and 1500° C., between 600° C. and 1300° C., or between 950° C. and 1250° C. Other ranges and values are also possible.

The first fluid heated by the electric heater may be any of a variety of suitable fluids. In some embodiments, for example, the first fluid is a gas, such as air (e.g., at ambient pressure). Other fluids are also possible for the first fluid, including liquids, and condensable fluids such as steam, as the disclosure is not meant to be limiting in this regard.

Thermal Storage System

In certain embodiments, the thermal battery system comprises a thermal storage system. In some embodiments, the thermal storage system used for a thermal battery is as described or is adapted from that described in commonly-owned International Patent Publication No. WO2012/037532, published Mar. 22, 2012, and titled, "Concentrated Solar Power Generation Using Solar Receivers", International Patent Publication No. WO2013/142275, published Sep. 26, 2013, and titled "Multi-Thermal Storage Unit Systems, Fluid Flow Control Devices, and Low Pressure Solar Receivers for Solar Power Systems, and Related Components and Uses Thereof", and International Patent Publication No. WO2021/202939, published Oct. 7, 2021, and titled "Concentrated Solar Energy Collection, Thermal Storage, and Power Generation Systems and Methods with Optional Supplemental Fuel Production", each of which are incorporated herein by reference in their entirety.

In some embodiments, the thermal storage system may comprise one or more thermal storage units or vessels (e.g., two thermal storage units, three thermal storage units, four thermal storage units, five thermal storage units, or more thermal storage units). According to some embodiments, the thermal storage unit(s) can enable a practical and cost-effective method to achieve thermal storage (e.g., of thermal energy produced by an electric heater) for use in generating electricity (e.g., for managing demand load of an electrical power grid). In some embodiments, the thermal storage unit comprises a vessel containing a thermal storage medium. In some such embodiments, the fluid (e.g., the first fluid) heated by the electric heater flows through the thermal storage medium, and the thermal storage medium stores thermal energy derived from the heated fluid at relatively high temperatures, depending on the temperature of the fluid heated by the electric heater (e.g., at least about 600° C., at least about 700° C., at least about 800° C., at least about 900° C., at least about 1000° C., at least about 1100° C., at least about 1200° C., at least about 1300° C., at least about 1400° C., at least about 1500° C., at least about 1600° C., at least about 1700° C., at least about 1800° C., at least about 1900° C., between 600° C. and 2000° C., between 700° C. and 1900° C., between 800° C. and 1800° C., between 900° C. and 1700° C., between 900° C. and 1500° C., between 900° C. and 1300° C., or between 950° C. and 1250° C.). In some embodiments, the heated fluid from the electric heater has a temperature of less than or equal to 2000° C., as indicated by any of the temperatures or temperature ranges noted above.

Referring to FIGS. 2A and 2B, thermal battery system 10*a* comprises thermal storage system 20. According to some embodiments, thermal storage system 20 is in switchable valved fluidic communication with both electric heater 16 and heat exchange system 12. Referring to FIG. 2A, for example, thermal storage system 20 may be in fluidic communication with electric heater 16 (e.g., via streams 202, 204, 206, 214, 216, blower 42*a*, and 218), according to some embodiments. In some embodiments, by closing valves (e.g., dampers) 302 and 304 and opening valve 306, thermal storage system 20 may be placed in fluidic communication with heat exchange system 12 (e.g., via streams 204, 206, 208, and 210), as shown in FIG. 2B.

Referring to FIG. 2A, and as mentioned above, thermal storage system 20 is configured to store thermal energy from electric heater 16 during a charging mode of thermal storage system 20, according to some embodiments. In certain embodiments, for example, thermal storage system 20 is configured to receive the first fluid heated by electric heater 16 (e.g., via streams 202, 204, and 206) and store thermal energy from the first fluid heated by electric heater 16. In some embodiments, the first fluid heated by electric heater 16 heats a thermal storage medium contained within thermal storage system 20.

Referring to FIG. 2B, during a discharging mode of thermal storage system 20, there is no fluid flow through electric heater 16, and heated and charged thermal storage system 20 is configured to heat the first fluid, which is circulated to heat exchange system 12 (e.g., via streams 204, 206, 208, and 210), for example under motive power of blower 42*b*. In some embodiments, thermal storage system 20 is configured to supply heat energy to power electricity generator and/or electrical power production system 22 during a discharging mode of thermal storage system 20.

According to some embodiments, a thermal storage vessel or unit of the thermal storage system can be fabricated using any of a variety of materials capable of withstanding the contemplated operating temperatures and pressures, including, for example, metals (e.g., stainless steel refractory metals such as tungsten, any of the metals mentioned above for the heating elements of the electric heater, and the like), ceramics (as materials of construction and/or thermal liners for insulation), and/or combinations thereof. In some embodiments, the thermal storage system is configured such that it includes a certified pressure vessel (e.g., ASME-certified, EN13445 certified, or a pressure vessel meeting a similar set of certification standards).

In certain embodiments, the thermal storage system can be fabricated in sections, such that two or more of the sections may be bolted together to assemble a thermal storage unit having a desired volumetric capacity. Fabrication of the thermal storage system in sections facilitates factory construction and transport and onsite assembly of storage units having relatively large volumetric capacity. In some configurations, sections of the thermal storage system may be in the range of 8 feet to 16 feet in length/height and 8 feet to 16 feet in diameter. In some configurations, for example, sections of the thermal storage system may be approximately 12 feet in length/height and 10 feet to 12 feet in diameter.

In some embodiments, individual thermal storage vessels or units of the thermal storage system can be sized to achieve relatively easy transport. For example, each thermal storage unit of a multi-unit system could be between about 2 and about 12 feet in diameter, and up to 50 feet long to enable easy shipment. The thermal storage units can be filled on site or prior to delivery to the site, which can allow for cost effective production and reduce on site construction cost and/or schedule delays.

A variety of fill media can be used in the thermal storage vessel(s) or unit(s). The fill media can comprise a variety of materials with high heat capacities that are able to retain their structural integrity at high temperatures, such as ceramics and other refractory materials. Exemplary materials include, but are not limited to, materials comprising aluminum oxides, iron oxides, silicon oxides, and/or magnesium oxides such as sand, ceramic pellets, fire brick, mullite, magnetite, PYRO GRAN 35/38, PYRO KOR 60NR, PYRO KOR 95NK, and/or PYROFER 70. In certain embodiments, the fill media comprises a high-temperature phase change material (e.g., a paraffin, lipid, sugar alcohol, salt hydrate, and/or the like). In some embodiments, the thermal storage media has a heat capacity of at least about 600 J/kg K, at least about 800 J/kg K, or at least about 900 J/kg K. It can be advantageous, in some embodiments, to use materials with relatively low densities (e.g., less than about 5 g/cm$^3$, less than about 3 g/cm$^3$, or less than about 2 g/cm$^3$).

The thermal storage media within the thermal storage vessel(s) or unit(s) can be of any suitable form factor and size. For example, pellets (e.g., substantially spherical pellets or pellets with any of the shapes described below) with maximum cross-sectional diameters in mm, cm, or larger length scales can be used as the thermal storage media, in some instance. In some embodiments, the thermal storage media can comprise pellets, and at least about 50%, at least about 75%, at least about 90%, at least about 95%, or at least about 99% of the pellets have maximum cross-sectional diameters of less than about 100 cm, less than about 10 cm, less than about 1 cm, between about 1 mm and about 100 cm, or between about 1 cm and about 100 cm. Suitable pellet shapes include, but are not limited to, shapes that are substantially rectangular prisms (e.g., bricks, substantially rectangular or cubic shapes), substantially triangular prisms, substantially spherical shapes, bow ties, honeycombs, saddles, and the like. In one set of embodiments, the thermal storage media is in the form of elongated tubes through which heated fluid is transported.

In certain embodiments, the thermal storage media within the thermal storage vessel(s) or unit(s) can be selected such that a step-function change in temperature does not occur during operation. That is to say, in such systems, the temperature profile of thermal storage media, when plotted linearly as a function of the distance along which fluid is transported through the thermal storage vessel(s) or unit(s) exhibits non-step-function behavior. In certain such embodiments, one end of the thermal storage unit (e.g., an inlet region) would be at a relatively high temperature while the other end of the thermal storage unit (e.g., an outlet region) would be at a relatively cooler temperature, with a non-step function change in temperature (e.g., a linear change in temperature, a concave up change in temperature, or a concave down change in temperature) in between. Such profiles can be achieved, for example, by using thermal storage media with relatively low thermal conductivities, such as ceramics.

In some embodiments, the interior of the thermal storage vessel(s) or unit(s) can be lined with a thermally insulating material and/or the outside of the thermal storage vessel(s) or unit(s) can be covered with a thermally insulating material to reduce heat loss to the atmosphere. For example, when the tank is manufactured out of metal, the tank can be lined with and/or covered with a refractory material (e.g., ceramics such as alumina, silica, magnesia, and the like). In some embodiments, the refractory material can be cast in place and/or can comprise a multi-layered structure in which the density and/or heat capacity can vary from layer to layer. In some embodiments, the thickness of the thermally insulating lining within the unit(s) can be between about 5 inches and about 15 inches (e.g., for a tank with a diameter up to 12 feet and a length of up to 40 feet). In some embodiments, the thickness of the thermally insulating material on the exterior of the thermal storage unit(s) can be up to 1 foot or up to 2 feet in thickness.

In certain embodiments, the thermal battery system may comprise multiple thermal storage systems (each of which can include one or more thermal storage units). In some such embodiments, a first thermal storage system can be used to store sensible heat provided by the electric heater, while a second thermal storage system can be used to provide a heated fluid to the electricity generator. In operation, a first thermal storage system or unit can be heated at low-pressure or atmospheric pressure by a working fluid heated by an electric heater until it is fully charged. At that point, it may be placed in fluid communication with the heat exchange system for discharging, as explained above in the context of FIG. 2B. Meanwhile, as the first thermal storage system is discharging, a second thermal storage unit or system which had been discharging but has cooled to the point of being spent can be placed in fluid communication with the electric heater as shown in FIG. 2A and recharged/reheated by the low-pressure working fluid heated by the electric heater. Operating the system in this manner can ensure that a stored heat source is always available for providing a heated fluid to the electricity generator. Thus, in some embodiments, substantially continuous operation of the electricity generator can be achieved.

Heat Exchange System

According to some embodiments, the thermal battery system comprises a heat exchange system. In some embodiments, the heat exchange system is as described or is adapted from those described in International Patent Publication No. WO2012/037532, published Mar. 22, 2012, and titled, "Concentrated Solar Power Generation Using Solar Receivers", International Patent Publication No. WO2013/142275, published Sep. 26, 2013, and titled "Multi-Thermal Storage Unit Systems, Fluid Flow Control Devices, and Low Pressure Solar Receivers for Solar Power Systems, and Related Components and Uses Thereof", and International Patent Publication No. WO2021/202939, published Oct. 7, 2021, and titled "Concentrated Solar Energy Collection, Thermal Storage, and Power Generation Systems and Methods with Optional Supplemental Fuel Production."

Referring to FIGS. 2A and 2B, in certain embodiments, thermal battery system 10a comprises heat exchange system 12. Heat exchange system 12 is configured to transfer heat from the first fluid heated by thermal storage system 20 and/or electric heater 16 to a second, typically compressed, fluid to produce a heated second fluid. It should be understood that, in some embodiments, while the heated first fluid is supplied to heat exchange system 12 from thermal storage system 20, thermal storage system 20 and the first fluid therein were initially heated by electric heater 16, therefore the first fluid was initially heated by electric heater 16, even though electric heater 16 may not be in fluid communication with heat exchange system 12 during discharge of thermal storage system 20.

The first fluid may, in some embodiments, be a relatively low-pressure fluid stream and the second fluid may be a relatively high-pressure fluid stream. In certain embodiments, for example, the pressure of the second fluid is greater than or equal to 2 atmospheres, greater than or equal to 5 atmospheres, greater than or equal to 10 atmospheres, greater than or equal to 15 atmospheres, greater than or equal to 20 atmospheres, greater than or equal to 25 atmospheres, greater than or equal to 30 atmospheres, greater than or equal to 35 atmospheres, greater than or equal to 40 atmospheres, or greater than or equal to 45 atmospheres. In some embodiments, the pressure of the second fluid is less than or equal to 50 atmospheres, less than or equal to 45 atmospheres, less than or equal to 40 atmospheres, less than or equal to 35 atmospheres, less than or equal to 30 atmospheres, less than or equal to 25 atmospheres, less than or equal to 20 atmospheres, less than or equal to 15 atmospheres, less than or equal to 10 atmospheres, or less than or equal to 5 atmospheres. Combinations of the above recited ranges are possible (e.g., the second fluid has a pressure between 2 atmospheres and 50 atmospheres, the second fluid has a pressure between 5 atmospheres and 20 atmospheres). Other ranges and values are also possible.

The second fluid may be any of a variety of suitable fluids. In some embodiments, for example, the second fluid is a gas, such as air. Other fluids are also possible for the second fluid, however, such as liquids or condensable fluids, like steam, as the disclosure is not meant to be limiting in this regard.

In some embodiments, the heat exchange system comprises at least a first heat exchanger and a second heat exchanger. In some embodiments, the heat exchange system may comprise more than two heat exchangers (e.g., three, four, five, or more heat exchangers) in series and/or parallel arrangements. Referring to FIGS. 2A and 2B, heat exchange system 12 comprises first heat exchanger 14a and second heat exchanger 14b. First heat exchanger 14a and second heat exchanger 14b may be connected in series, according to certain embodiments. In some embodiments, heat exchange system 12 is positioned downstream from thermal storage system 20.

In some embodiments, at least one heat exchanger in the heat exchange system can be configured such that the heat exchanger simultaneously contains the heated first fluid having a first pressure and the second fluid having a higher, second pressure, which may, in certain embodiments involve simultaneous (e.g., countercurrent) flow of the first and second fluids through the heat exchange unit (e.g., in fluidically separate but thermally communicating flow paths within the heat exchangers). For example, in some embodiments, at least one heat exchanger in the heat exchange system comprises a first inlet (e.g., inlet 28a of first heat exchanger 14a) through which the heated first fluid having a first pressure (e.g., air at a relatively low-pressure, for example, of less than or equal to 2 atmospheres) is transported into and through the heat exchanger and a second inlet (e.g., inlet 29a of first heat exchanger 14a) through which a second fluid at a relatively higher pressure (e.g., air at a pressure above 2 atmospheres) is simultaneously transported into and through the heat exchanger. By configuring one or more heat exchangers in this manner, the efficiency and rate of heat transferred from the heated first fluid having a first pressure to the second fluid having a higher, second pressure can be enhanced. Heat exchange system 12 may, in some embodiments. be configured to operate in countercurrent or co-current mode (i.e., with first fluid and second fluid flow within the heat exchanger(s) in the opposite or same directions, respectively).

In some embodiments, one or more of the heat exchangers used to transfer heat from the heated first fluid to the second fluid can be a rotary heat exchanger (e.g., a ceramic rotary recuperator). Suitable rotary heat exchangers may be in the form of a rotary regenerator such as one or more of those described, for example, in U.S. Pat. No. RE37134, issued on Apr. 17, 2001, filed Mar. 25, 1995, entitled "Heat Exchanger Containing a Component Capable of Discontinuous Movement"; U.S. Publication No. 2007/0089283, published on Apr. 26, 2007, filed Oct. 17, 2006, entitled "Intermittent Sealing Device and Method"; U.S. Publication No. 2008/0251234, published on Oct. 16, 2008, filed Apr. 16, 2007, entitled "Regenerator Wheel Apparatus"; U.S. Publication No. 2009/0000761, published on Jan. 1, 2009, filed Jun. 29, 2007, entitled "Regenerative Heat Exchanger with Energy-Storing Drive System"; U.S. Publication No. 2009/0000762, published on Jan. 1, 2009, filed Jun. 29, 2007, entitled "Brush-Seal and Matrix for Regenerative Heat Exchanger and Method of Adjusting Same"; and U.S. Publication No. 2006/0054301, published on Mar. 16, 2006, filed Dec. 16, 2004, entitled "Variable Area Mass or Area and Mass Species Transfer Device and Method."

Ceramic rotary heat exchangers can be capable of operating at relatively high temperatures (e.g., up to at least about 1200° C. in some cases), which can allow one to generate higher temperatures within the solar receiver and energy storage systems to supply the higher temperature second gas to power a gas turbine (as explained below in greater detail), thereby increasing system efficiency. The heat exchange system described herein is not limited to the use of rotary heat exchangers, and, in some embodiments, one or more of the heat exchangers (e.g., the heat exchangers used to transfer heat energy from the heated first fluid to the second fluid) can be any of a wide variety of suitable heat exchanger configurations, including, but not limited to, a plate heat exchanger, a tube heat exchanger (e.g., a shell and tube heat exchanger), and the like.

In some embodiments, at least one of the heat exchangers can be a metallic heat exchange unit. In certain embodiments, the first heat exchanger and any subsequent heat exchangers (e.g., the second heat exchange unit, the third heat exchange unit, etc.) may be different types. For example, in some embodiments, the first heat exchange unit (e.g., first heat exchanger 14a in FIGS. 2A and 2B) may be a ceramic heat exchange unit (e.g., a ceramic rotary heat exchange unit, a ceramic plate heat exchange unit, a ceramic tube heat exchange unit, etc.), while the second heat exchanger (e.g., second heat exchanger 14b in FIGS. 2A and 2B) may be a metallic heat exchanger. In some embodiments, the heated first fluid can be transported to a first ceramic heat exchanger (e.g., first heat exchanger 14a in FIGS. 2A and 2B) (where a relatively high maximum temperature might be observed), and subsequently transported to a metallic heat exchange unit (e.g., second heat exchanger 14b in FIGS. 2A and 2B) (where the maximum temperature might be lower than that observed in the ceramic heat exchanger).

In some embodiments, the system may comprise a heat exchanger that is configured to be operated at very high temperatures. For example, in some embodiments, the system can include one or more heat exchangers (e.g., first heat exchanger 14a and/or second heat exchanger 14b in FIGS. 2A and 2B) that can be operated above temperatures of 800° C., and, in some embodiments, temperatures of up to 1000° C. or more. In some embodiments, for example, the system can include one or more heat exchangers that can be operated at temperatures of up to 1100° C. or up to 1400° C., or any of the above-mentioned temperatures produced by the thermal storage system and electric heater. High temperature heat exchangers can comprise one or more materials configured to withstand high temperature operation including, for example, one or more ceramics (e.g., aluminum oxides, iron oxides, silicon oxides, magnesium oxides, etc.). In some embodiments, the heat exchanger can comprise one or more metals and/or alloys (e.g., nickel, chromium, titanium, tungsten, molybdenum, tantalum, columbium, a super alloy thereof, and the like, including any of the metals and/or super alloys described elsewhere herein). As specific examples, all or part of a high temperature heat exchanger can be formed of Alloy 230®, Alloy 214®, and/or Alloy 556® from Haynes International.

According to certain embodiments, the use of multiple heat exchangers, such as one relatively small, heat exchanger capable of exchanging heat at the highest contemplated operating high temperatures and one comparatively inexpensive heat exchanger for exchanging heat at relatively low temperatures, instead of a single large heat exchanger able to withstand the highest contemplated operating temperatures, can allow one to achieve efficient heat exchange while reducing cost.

Figure 3:
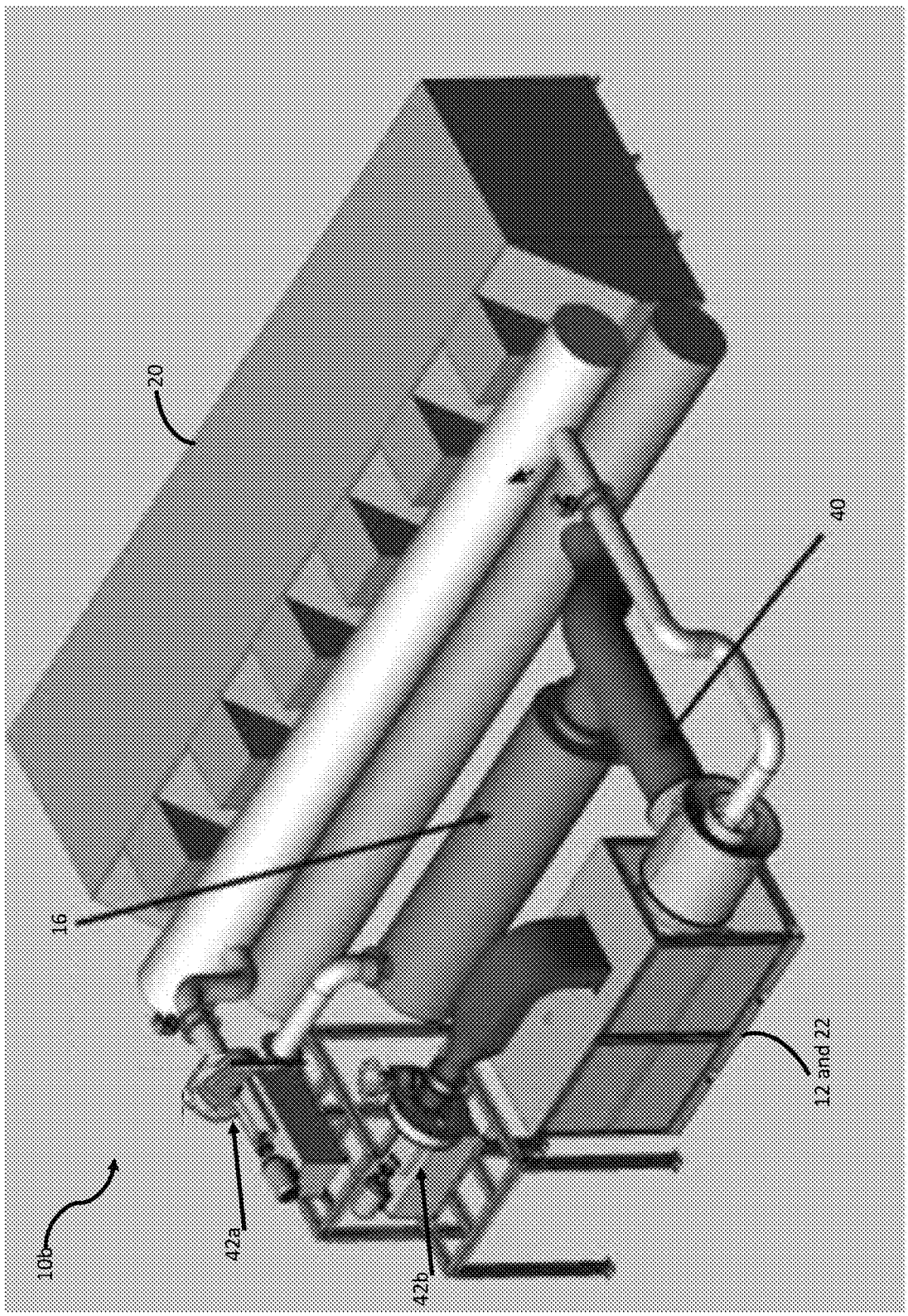
FIG. 3 shows, according to some embodiments, an illustration of a thermal battery system.

In some embodiments, the heat exchange system may be configured as a component of a power generation system (e.g., in conjunction with electric generator 22 including one or more compressors 26 and turbines 24). Referring to FIGS. 2A and 2B, for example, thermal battery system 10a comprises heat exchange system 12, compressor 26, and turbine 24 in fluid communication with and downstream of outlet 32a of heat exchanger 14a. In other embodiments, heat exchange system 12 and electrical generator 22 may be separate, interconnected units. In some embodiments, heat exchange system 12 and electrical generator 22 may be integrated as a single unit (e.g. within a single housing as shown in FIG. 3), as the disclosure is not meant to be limiting in this regard.

Electricity Generator

According to certain embodiments, the thermal battery system comprises an electricity generator and/or electrical power production system. The electricity generator and/or electrical power production system for use in the thermal battery system may be as described, or adapted from that described, in International Patent Publication No. WO2012/037532, published Mar. 22, 2012, and titled, "Concentrated Solar Power Generation Using Solar Receivers", International Patent Publication No. WO2013/142275, published Sep. 26, 2013, and titled "Multi-Thermal Storage Unit Systems, Fluid Flow Control Devices, and Low Pressure Solar Receivers for Solar Power Systems, and Related Components and Uses Thereof", and International Patent Publication No. WO2021/202939, published Oct. 7, 2021, and titled "Concentrated Solar Energy Collection, Thermal Storage, and Power Generation Systems and Methods with Optional Supplemental Fuel Production."

Referring to FIGS. 2A and 2B, thermal battery system 10a comprises electricity generator 22. In some embodiments, the electricity generator comprises at least one gas turbine and compressor. As shown in FIGS. 2A and 2B, for example, electricity generator 22 comprises gas turbine 24 and compressor 26. While a single turbine and compressor are illustrated in FIGS. 2A and 2B, it should be understood the electricity generator is not so limited, and that, in some embodiments, multiple turbines and/or compressors can be employed. For example, in some embodiments, the electricity generator includes at least 2, at least 3, at least 4, at least 5, or more turbines and/or compressors, with in some embodiments, the compressor and turbine paired and functioning together as illustrated. A single turbine and/or the combination of multiple turbines can be capable of producing any of a variety of suitable amounts of power (e.g., at least 500 kW, at least 1 MW, etc., as described below in greater detail). One of ordinary skill in the art would be capable of selecting an appropriate turbine and/or combination of turbines to use, given a desired power output requirement and system capacity. In certain non-limiting embodiments, the turbine is a Capstone C200S microturbine, commercially available from Capstone Turbine Corporation. Other commercially available turbines may also be employed, as the disclosure is not meant to be limiting in this regard.

Electricity generator 22 may, in some embodiments, be packaged/housed together with heat exchange system 12 and an electromagnetic generator 34 that converts the mechanical energy of a rotating shaft (e.g., 52a, 52b) to electricity. Heat exchange system 12, gas turbine 24, compressor 26, and electromagnetic generator 34 may, in some embodiments, be used to generate power (e.g., electrical power) using, for example, primarily a Brayton cycle (or other appropriate thermodynamic power cycle). In other embodiments, heat exchange system 12 and electrical generator 22 may be separate, interconnected units, as the disclosure is not meant to be limiting in this regard.

In order to increase system efficiency, the fluid supplied to turbine 24 may be relatively hot and relatively highly pressurized. To achieve high pressures, compressor 26 may be used to compress a relatively low-pressure fluid (e.g., ambient air) to produce a relatively high-pressure fluid (e.g., pressurized air). In some embodiments, for example, compressor 26 may be configured to supply the second fluid in a pressurized state to inlet 28b of second heat exchanger 14b, according to certain embodiments. As explained herein, compressor 26 may be used to produce a second fluid with a pressure of greater than or equal to 2 atmospheres, greater than or equal to 5 atmospheres, greater than or equal to 10 atmospheres, greater than or equal to 15 atmospheres, greater than or equal to 20 atmospheres, greater than or equal to 25 atmospheres, greater than or equal to 30 atmospheres, greater than or equal to 35 atmospheres, greater than or equal to 40 atmospheres, or greater than or equal to 45 atmospheres. In certain embodiments, compressor 26 may be used to produce a second fluid with a pressure between 2 atmospheres and 50 atmospheres, between 2 atmospheres and 25 atmospheres, between 4 atmospheres and 5 atmospheres, or between 5 atmospheres and 6 atmospheres. Other ranges and values are also possible.

In some embodiments, the second fluid may enter inlet 27 of compressor 26 from an external atmosphere (e.g., via stream 220).

In some embodiments, turbine 24 is positioned with inlet 30 in fluid communication with and downstream from outlet 32a of first heat exchanger 14a such that the heated second fluid in a pressurized state discharged from outlet 33b of second heat exchanger 14b is fed into inlet 29a of first heat exchanger 14a and discharged from outlet 32a of first heat exchanger 14a into inlet 30 of turbine 24 (e.g., via stream 212) so that turbine 24 is able to generate electrical power 36 therefrom. In certain embodiments, electrical power 36 is generated via rotation of shaft 52b and electromagnetic generator 34.

The pressure of the heated second fluid discharged from outlet 32a of first heat exchanger 14a and delivered to inlet 30 of turbine 24 may be any of the aforementioned pressures with respect to the heated second fluid pressurized by the compressor. In some embodiments, for example, the heated second fluid delivered to inlet 30 of turbine 24 may have a pressure between 2 atmospheres and 50 atmospheres, between 2 atmospheres and 25 atmospheres, between 4 atmospheres and 5 atmospheres, or between 5 atmospheres and 6 atmospheres.

The heated second fluid in a pressurized state delivered to inlet 30 of turbine 24 may have any of a variety of suitable temperatures. In some embodiments, the temperature of the heated second fluid entering the turbine is greater than or equal to 550° C., greater than or equal to 600° C., greater than or equal to 650° C., greater than or equal to 700° C., greater than or equal to 750° C., greater than or equal to 800° C., greater than or equal to 850° C., greater than or equal to 900° C., greater than or equal to 950° C., greater than or equal to 1000° C., greater than or equal to 1050° C., greater than or equal to 1100° C., greater than or equal to 1150° C., greater than or equal to 1200° C., greater than or equal to 1250° C., greater than or equal to 1450° C., greater than or equal to 1650° C., greater than or equal to 1850° C., or greater than or equal to 1950° C. In certain embodiments, the electric heater is able to heat the first fluid to between 550° C. and 1950° C., between 550° C. and 1650° C., between 550° C. and 1450° C., between 550° C. and 1250° C., between 900° C. and 1150° C., or between 900 and 950° C. Other ranges and values are also possible. According to some embodiments, the temperature of the heated second fluid entering the turbine may be somewhat lower than the temperature of the heated first fluid supplied to the heat exchange system from the thermal storage system.

In certain embodiments, outlet 32a of first heat exchanger 14a and/or inlet 30 of turbine 24 may comprise an optional mixing valve that is configured to adjust the temperature and/or pressure of the heated second fluid delivered to turbine 24, if necessary. According to some embodiments, for example, the mixing valve is configured to introduce a supplemental fluid (e.g., ambient air) into the mixing valve such that the supplemental fluid mixes with the heated second fluid and adjusts the temperature and/or pressure thereof. According to certain embodiments, electromagnetic generator 34 is configured to be connected or is connected in electrical communication with electric power grid 18 to supply electrical power 36 thereto. In some embodiments, electrical power 36 may be supplied to electric power grid via power and/or transmission line 54b.

According to some embodiments, exhaust outlet 46 of turbine 24 is recycled to the thermal storage system by being fluidically connected to inlet 48 of thermal storage system 20 (e.g., via streams 222, 224, 226, and 228).

The second fluid exhausted from the turbine may be recycled to the thermal storage system at any of a variety of suitable exhaust pressures. In some embodiments, for example, the second fluid is recycled to thermal storage system from the turbine at an exhaust pressure less than or equal to 2 atmospheres, less than or equal to 1.9 atmospheres, less than or equal to 1.8 atmospheres, less than or equal to 1.7 atmospheres, less than or equal to 1.6 atmospheres, less than or equal to 1.5 atmospheres, less than or equal to 1.4 atmospheres, less than or equal to 1.3 atmospheres, less than or equal to 1.2 atmospheres, less than or equal to 1.1 atmospheres, less than or equal to 1 atmosphere, less than or equal to 0.9 atmospheres, less than or equal to 0.8 atmospheres, less than or equal to 0.7 atmospheres, less than or equal to 0.6 atmospheres, or less. In certain embodiments, the second fluid is recycled to the thermal storage system from the turbine at an exhaust pressure between 2 atmospheres and 0.5 atmospheres, between 1.1 atmospheres and 0.9 atmospheres, etc. Other ranges and values are also possible.

The second fluid exhausted from the turbine may be recycled to the thermal storage system at any of a variety of suitable temperatures. In some embodiments, for example, the second fluid is recycled to the thermal storage system from the turbine at a temperature greater than or equal to 500° C., greater than or equal to 550° C., greater than or equal to 600° C., or greater than or equal to 650° C. In certain embodiments, the second fluid is recycled to the thermal storage system from the turbine at a temperature less than or equal to 700° C., less than or equal to 650° C., less than or equal to 600° C., or less than or equal to 550° C. Combinations of the above recited ranges are possible, e.g., the second fluid is recycled to the thermal storage system from the turbine at a temperature between 500° C. and 700° C., between 550° C. and 600° C., between 600° C. and 650° C. etc. Other ranges and values are also possible. According to some embodiments, the temperature of the second fluid exhausted from the turbine may be somewhat lower than the temperature of the heated second fluid entering the turbine.

Other Optional Components, Capabilities, and Configurations

In some embodiments, the thermal battery system may include a supplemental heat source, such as a combustor and/or solar receiver or other solar-powered heater. Referring, for example, to FIGS. 2A and 2B, thermal battery system 10a comprises combustor 40. Combustor 40 may be configured, in certain embodiments, to provide supplemental heating of the first fluid fed to the heat exchange system. According to some embodiments, combustor 40 may be configured to burn a fuel (e.g., an emission free fuel, such as hydrogen) to provide backup power for supplemental heating of the first fluid. Configuring the thermal battery system with a combustor advantageously provides a system that is capable of delivering electrical power to the electrical power source at substantially anytime, including when the thermal storage system has been fully discharged. In certain embodiments, combustor 40 is in fluidic communication with and upstream from heat exchange system 12. In addition, or alternatively, a combustor could be located where element 50a is shown in FIG. 2A, to permit the combustor to charge the thermal storage system during a charging mode even if no electric power is available to power the electric heater 16.

In certain embodiments, the thermal battery system comprises a primary first fluid blower. Referring to FIGS. 2A and 2B, for example, thermal battery system 10*a* comprises primary first fluid blower 42*a*. In some embodiments, primary first fluid blower 42*a* is positioned between and in fluidic communication with thermal storage system 20 and electric heater 16. In some embodiments, blower 42*a* facilitates the flow of the heated first fluid to and from electric heater 16 to thermal storage system 20 (e.g., recirculation flow when the thermal battery system is in the charging mode).

According to some embodiments, the thermal battery system comprises a second first fluid blower. Referring, for example, to FIGS. 2A and 2B, thermal battery system 10*a* comprises second first fluid blower 42*b*. Second first fluid blower 42*b* may be positioned, downstream from outlet 32*b* of second heat exchanger 14*b*. According to certain embodiments, second first fluid blower 42*b* is configured to drive discharge the first fluid from outlet 32*b* of second heat exchanger 14*b* after the first fluid has transferred heat to the second fluid via heat exchange system 12, e.g., during the discharging mode of the thermal battery system. As explained in further detail below, and as shown in FIG. 2B, second fluid blower 42*b* may feed the discharged first fluid from outlet 32*b* of second heat exchanger 14*b* to industrial processing unit 44*b* or other destination where the residual heat energy remaining in the first fluid discharge from the heat exchange system can be effectively utilized. In other embodiments, second fluid blower 42*b* may discharge the first fluid from outlet 32*b* of second heat exchanger 14*b* to the surrounding atmosphere.

In certain embodiments, the thermal battery system may comprise one or more solar receivers and/or industrial heat input sources. Referring to FIGS. 2A and 2B, thermal battery system 10*a* may comprise solar receivers and/or industrial heat sources 50*a* and 50*b*. Solar receiver and/or industrial heat source 50*a* may be positioned so that it is in fluid communication between electric heater 16 and thermal storage system 20 during charging (as shown in FIG. 2A) and in fluid communication between thermal storage system 20 and heat exchange system 12 during discharging (as shown in FIG. 2B). In certain embodiments, solar receiver and/or industrial heat source 50*a* may be configured to provide supplemental heating of the first fluid delivered from electric heater 16 to thermal storage system 20 during charging (as shown in FIG. 2A) or supplemental heating of the first fluid delivered from thermal storage system 20 to heat exchange system 12 during discharging (as shown in FIG. 2B). Solar receiver and/or industrial heat source 50*b* may, in some embodiments, be positioned in fluid communication between turbine 26 and thermal storage system 20 to heat the recycle stream from the turbine during discharge (as shown in FIG. 2A 2B). Solar receiver and/or industrial heat source 50*b* may, in some embodiments, be configured to provide supplemental heating of the second fluid that is recycled from turbine 24 to thermal storage system 20 during the discharging mode or cycle.

Further details regarding the structure and function of the solar receiver, combustor, and/or industrial heat source are described and illustrated in International Patent Publication No. WO2012/037532, published Mar. 22, 2012, and titled, "Concentrated Solar Power Generation Using Solar Receivers", International Patent Publication No. WO2013/142275, published Sep. 26, 2013, and titled "Multi-Thermal Storage Unit Systems, Fluid Flow Control Devices, and Low Pressure Solar Receivers for Solar Power Systems, and Related Components and Uses Thereof", and International Patent Publication No. WO2021/202939, published Oct. 7, 2021, and titled "Concentrated Solar Energy Collection, Thermal Storage, and Power Generation Systems and Methods with Optional Supplemental Fuel Production."

According to some embodiments, residual (e.g., "waste") heat energy from the thermal battery system may be used to supply heat energy to one or more industrial processing units. Referring to FIGS. 2A and 2B, for example, thermal battery system 10*a* supplies heated first fluid exhaust from the heat exchange system 12 to industrial processing unit 44*b*, and supplies heated, expanded second fluid exhaust from the turbine 24 to industrial processing unit 44*a*. Industrial processing unit 44*a* may, in some embodiments, be configured to receive residual heat from exhaust outlet 46 of turbine 24. Referring to FIG. 2B, for example, exhaust outlet 46 of turbine 24 is fluidically connected to industrial processing unit 44*a* via streams 222, 224, and 230, such that industrial processing unit 44*a* is configured to receive the expanded, but still hot second fluid from exhaust outlet 46 of turbine 24

Industrial processing unit 44*b* is configured to receive residual heat from the spent first fluid exiting the heat exchange system after heating the pressurized second fluid used for electrical power generation. Referring, for example, to FIG. 2B, outlet 32*b* of second heat exchanger 14*b* is fluidically connected to industrial processing unit 44*b* (e.g., via stream 230), such that industrial processing unit 44*b* is configured to receive the first fluid from outlet 32*b* of second heat exchanger 14*b*.

The industrial processing unit can utilize residual heat contained in streams that may otherwise simply be vented to the atmosphere to, for example, operate or facilitate operation of one or more unit operations of the industrial processing unit. The fluid received by the industrial processing unit may be any of a variety of suitable temperatures. In some embodiments, for example, the temperature of the fluid received by the industrial processing unit 44*b* may be greater than or equal to 100° C., greater than or equal to 200° C., greater than or equal to 300° C. or greater than or equal to 400° C. In certain embodiments, the temperature of the fluid received by the industrial processing unit may be less than or equal to 500° C., less than or equal to 400° C., less than or equal to 300° C., or less than or equal to 200° C. Combinations of the above recited ranges are possible (e.g., the temperature of the fluid received by the industrial processing unit 44*b* is greater than or equal to 100° C. and less than or equal to 500° C., the temperature of the fluid received by the industrial processing unit 44*b* is greater than or equal to 200° C. and less than or equal to 300° C. In one non-limiting embodiment, the fluid received by the industrial processing unit 44*b* is about 250° C. Other ranges and values are also possible.

In some embodiments, the temperature of the fluid received by the industrial processing unit 44*a* may be greater than or equal to 400° C., greater than or equal to 500° C., greater than or equal to 600° C. or greater than or equal to 700° C. In certain embodiments, the temperature of the fluid received by the industrial processing unit 44*a* may be less than or equal to 800° C., less than or equal to 700° C., less than or equal to 600° C., or less than or equal to 500° C. Combinations of the above recited ranges are possible (e.g., the temperature of the fluid received by the industrial processing unit 44*a* is greater than or equal to 400° C. and less than or equal to 800° C., the temperature of the fluid received by the industrial processing unit 44*a* is greater than or equal to 500° C. and less than or equal to 700° C.). In one non-limiting embodiment, the fluid received by the industrial processing unit 44a is about 650° C. Other ranges and values are also possible.

Any of a variety of suitable industrial processing units may be suitable for the above-described operations, including, but not limited to, a water purification system, a chemical separation system, a chemical reactor, and/or an industrial generator (e.g., steam generator). In some embodiments, the water purification system is a desalination system. In certain embodiments, the chemical separation system is a distillation system.

Further details regarding the structure and function of the industrial processing unit are described and illustrated in International Patent Publication No. WO2021/202939, published Oct. 7, 2021, and titled "Concentrated Solar Energy Collection, Thermal Storage, and Power Generation Systems and Methods with Optional Supplemental Fuel Production."

FIG. 3 shows an illustration of the unit operations of a thermal battery system 10b configured similarly to the process flow diagrams of FIGS. 2A and 2B, albeit without the industrial processing unit options, without any solar receivers, and not showing electrical connectivity. Thermal battery system 10b comprises electric heater 16, thermal storage system 20, a combined heat exchange/electrical generator system 12/22, optional combustor 40, and blowers 42a and 42b.

As described herein, and as shown in FIG. 3, heat exchange system 12 may be configured as a component of electrical generator 22, according to some embodiments. In certain embodiments, for example, heat exchange system 12 and electrical generator 22 may be contained within the same housing. In other embodiments, heat exchange system 12 and electrical generator 22 may be separate, interconnected units, as the disclosure is not meant to be limiting in this regard.

According to certain embodiments, the thermal battery system has a storage capacity sufficient to provide the amount of energy storage needed or desired for a particular electrical load management situation. In some embodiments, for example, the thermal battery system has an energy storage and delivery capacity greater than or equal to 100 kilowatt hours (kWH), 500 kWH, 1 megawatt hours (MWH), greater than or equal to 1.5 MWH, greater than or equal to 2 MWH, greater than or equal to 2.5 MWH, greater than or equal to 5 MWH, greater than or equal to 10 MWH, greater than or equal to 20 MWH, greater than or equal to 30 MWH, greater than or equal to 40 MWH, greater than or equal to 50 MWH, greater than or equal to 60 MWH, greater than or equal to 70 MWH, greater than or equal to 80 MWH, greater than or equal to 90 MWH, greater than or equal 100 MWH, or greater than or equal to 110 MWH of electricity sustained over a period of at least 4 hours, for example, 5-75 hours, 10-60 hours, or 8-10 hours. In some embodiments, the thermal battery system has the ability to produce a peak and/or sustained electrical output power during the discharging mode of at least 50 kilowatts (kW), 100 kW, 150 kW, at least 200 kW, at least 500 kW, at least 1 megawatt (MW), at least 1.5 MW, at least 2 MW, at least 2.5 MW, at least 5 MW, or at least 10 MW. In certain embodiments, the thermal battery system has an energy storage and delivery capacity between 100 kWH, and 1 MWH, between 1 MWH and 115 MWH, between 1.5 MWH and 110 MWH, between 1.8 MWH and 110 MWH, between 2 MWH and 100 MWH, between 5 MWH and 75 MWH, or between 6 MWH and 72 MWH, of electricity sustained over a period of at least 4 hours, for example, 5-75 hours, 10-60 hours, or 8-10 hours. In some embodiments, the thermal battery system has the ability to produce a peak and/or sustained electrical output power during the discharging mode between 50 kW and 200 kW, between 200 kW and 15 MW, between 500 kW and 10 MW, between 1 MW and 2.5 MW, or between 200 kW and 1 MW. Other ranges and values are also possible.

As used herein, the electrical power as measured in watts (W) may also be referred to as watts of electric capacity (We).

In certain embodiments, any of the above thermal battery systems may operate by drawing electrical power from an electrical power source 18 of FIG. 2A (e.g., an electrical power grid) via power and/or transmission line 54a during low electricity consumer demand periods. The electrical power is converted to heat, e.g., by electric heater 16, and heats thermal storage system 20 and is stored as thermal energy therein. Electrical power may then be generated from the stored heat energy during peak electricity consumer demand periods, and then delivered to electrical power source 18 (e.g., electrical power grid) via power and/or transmission line 54b.

Steam Turbine Bottoming Cycles

Figure 4A:
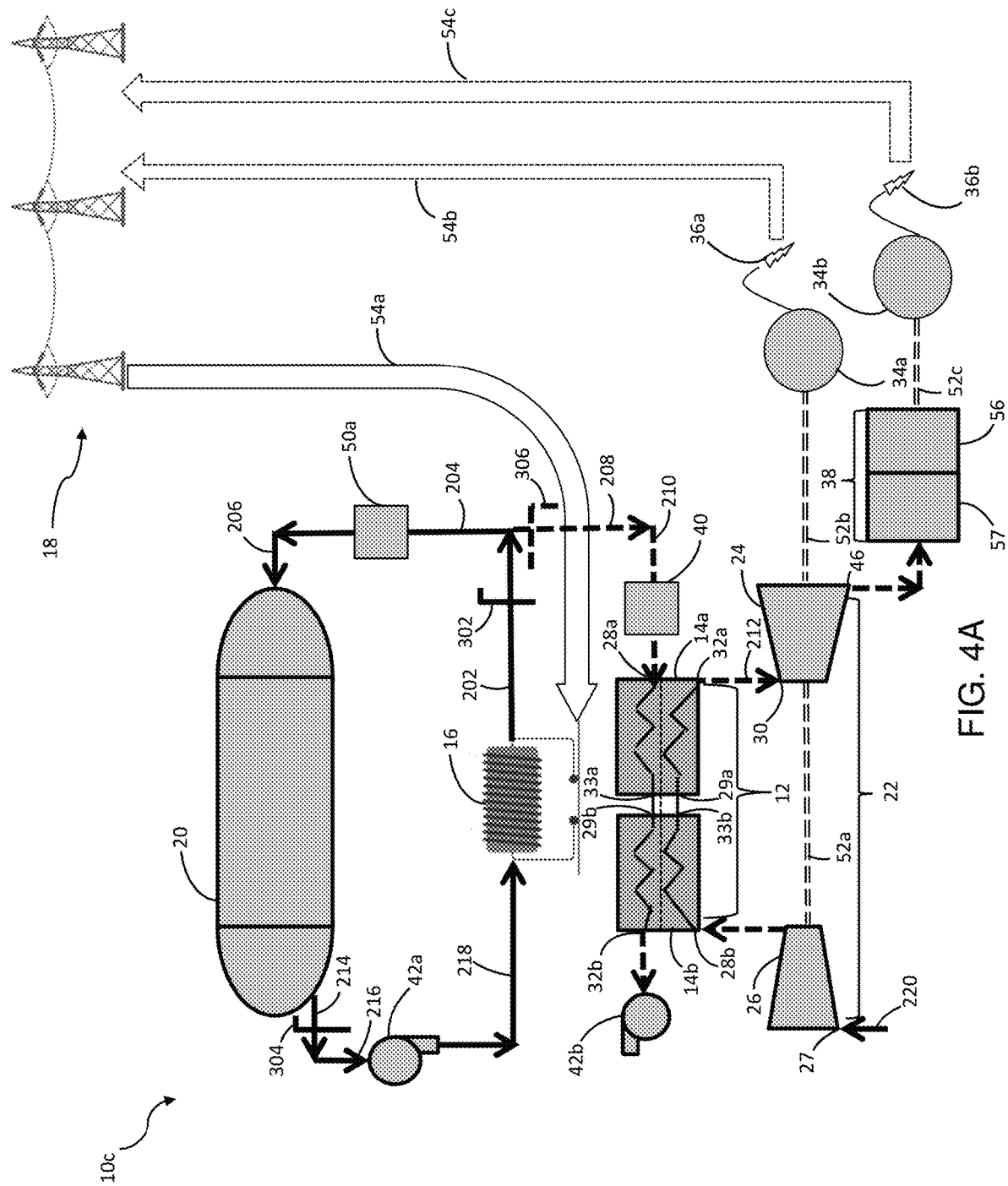
FIG. 4A shows, according to some embodiments, a schematic diagram of the components of a thermal battery system comprising a steam turbine bottoming cycle system and their state of operation during charging.
Figure 4B:
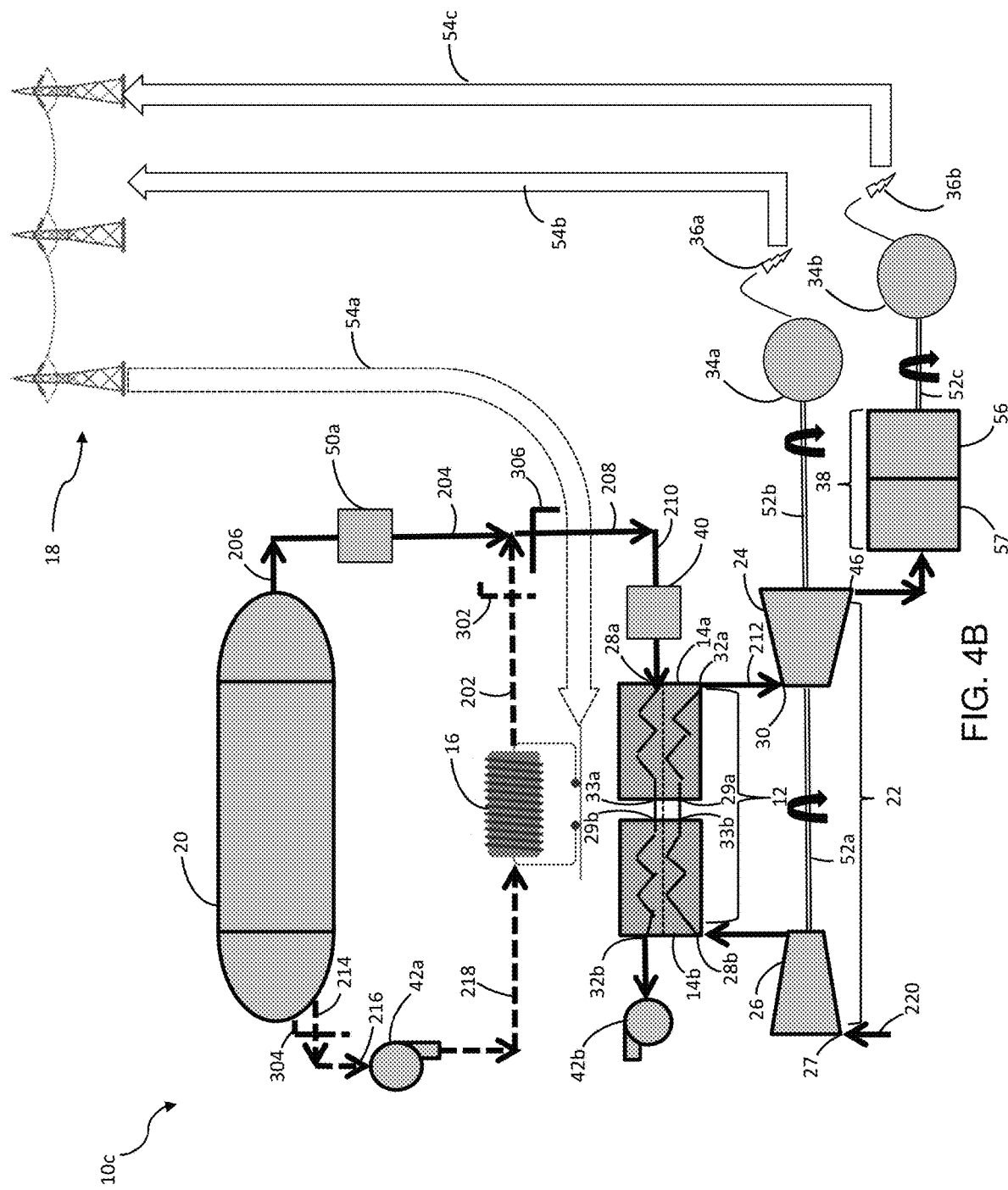
FIG. 4B shows, according to some embodiments, a schematic diagram of the components of a thermal battery system comprising a steam turbine bottoming cycle system and their state of operation during discharging.

According to certain embodiments, the thermal battery system can be used so that the "waste" heat stream exhausting the turbine is used to power a steam turbine bottoming cycle system. FIGS. 4A and 4B show, according to some embodiments, schematic diagrams of the components of a thermal battery system comprising a steam turbine bottoming cycle system during charge and discharge, respectively. As shown in FIGS. 4A and 4B, thermal battery system 10c comprises steam turbine bottoming cycle system 38. According to some embodiments, thermal battery system 10c functions similarly to thermal battery system 10b (e.g., as shown in FIGS. 2A and 2B and described above). Instead of, or in addition to, recycling the second fluid from the turbine to the thermal storage system (e.g., as shown in FIGS. 2A and 2B and described above), thermal battery system 10c may be configured to deliver the second fluid from turbine 24 to steam turbine bottoming cycle system 38.

In some embodiments, steam turbine bottoming cycle system 38 is positioned in downstream fluidic communication with exhaust outlet 46 of turbine 24. Referring to FIG. 4B, steam turbine bottoming cycle system 38 may, in some embodiments, comprise steam turbine 56 for generating electrical power 36b (e.g., via shaft 52c and electromagnetic generator 34b). In certain embodiments, for example, steam turbine bottoming cycle system 38 is configured to receive the second fluid from exhaust outlet 46 of turbine 24 and generate electrical power 36b therefrom utilizing steam turbine 56. Steam turbine bottoming cycle system 38 may comprise additional components, according to some embodiments, such as steam boiler 57 that is configured to produce pressurized steam from heat energy contained in the second fluid exiting exhaust outlet 46 of turbine 24, which steam is then used to drive steam turbine 56 to produce electrical power 36b.

The second fluid may be delivered from exhaust outlet 46 of turbine 24 to steam turbine bottoming cycle system 38 at any of a variety of suitable exhaust pressures. In some embodiments, for example, the second fluid is delivered to the steam turbine bottoming cycle system at an exhaust pressure less than or equal to 2 atmospheres, less than or equal to 1.9 atmospheres, less than or equal to 1.8 atmospheres, less than or equal to 1.7 atmospheres, less than or equal to 1.6 atmospheres, less than or equal to 1.5 atmospheres, less than or equal to 1.4 atmospheres, less than or equal to 1.3 atmospheres, less than or equal to 1.2 atmospheres, less than or equal to 1.1 atmospheres, less than or equal to 1 atmosphere, less than or equal to 0.9 atmospheres, less than or equal to 0.8 atmospheres, less than or equal to 0.7 atmospheres, less than or equal to 0.6 atmospheres, or less. In certain embodiments, the second fluid is delivered to the steam turbine bottoming cycle system at an exhaust pressure between 2 atmospheres and 0.5 atmospheres, or between 1.1 atmospheres and 0.9 atmospheres. Other ranges and values are also possible.

The second fluid may be delivered from exhaust outlet 46 of turbine 24 to steam turbine bottoming cycle system 38 at any of a variety of suitable temperatures. In some embodiments, for example, the second fluid is delivered to the steam turbine bottoming cycle system at a temperature greater than or equal to 500° C., greater than or equal to 550° C., or greater than or equal to 600° C., greater than or equal to 650° C., or greater than or equal to 700° C. In certain embodiments, the second fluid is delivered to the steam turbine bottoming cycle system at a temperature between 500° C. and 700° C., or between 550° C. and 675° C., or at a temperature of about 650° C. Other ranges and values are also possible.

According to certain embodiments, electrical power 36b may be delivered back to electrical power source 18 (e.g., electrical power grid). Thermal battery system 10c may, in some embodiments, be configured to generate electrical power 36a via gas turbine 24 and electrical power 36b via steam turbine 56, both of which may be delivered back to electrical power source 18 (e.g., electrical power grid) via power and/or transmission lines 54b and 54c, respectively.

Arrayed Thermal Batteries to Power a Steam Power Plant

Figure 5A:
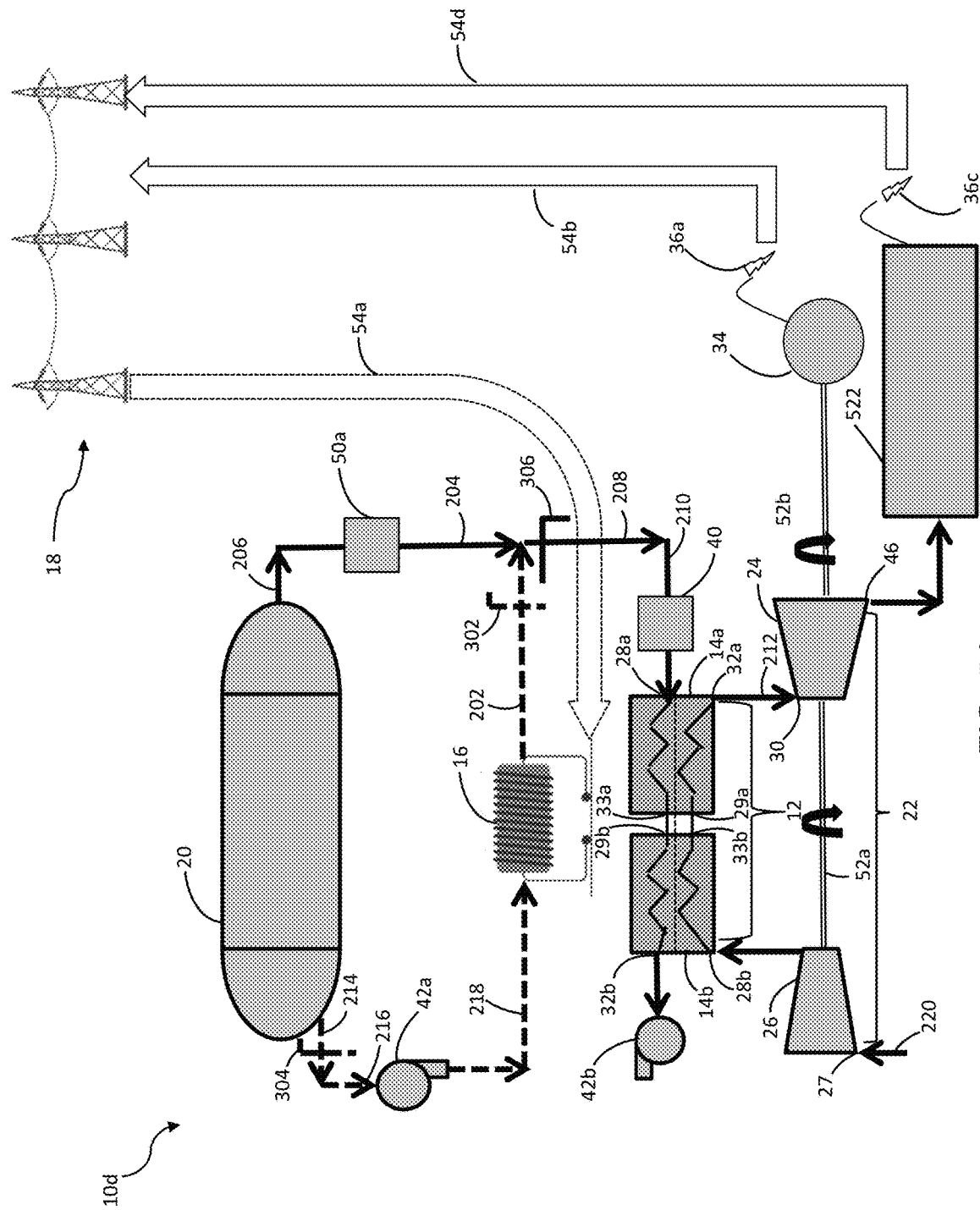
FIG. 5A shows, according to some embodiments, a schematic diagram of the components of a thermal battery system and their state of operation during discharging, where the hot gas exhaust of the turbine is used to power a steam power plant.

According to certain embodiments, arrays of the thermal batteries can be used to power a steam power plant. In some embodiments, the steam power plant is a recommissioned (e.g., repurposed) steam power plant, such that the steam power plant was formerly a coal-fired steam power plant that has since been decommissioned. FIG. 5A shows a schematic diagram of the components of a thermal battery system during the discharge cycle for use in an array of such systems for powering a steam power plant (e.g., a recommissioned steam power plant). As shown in FIG. 5A, thermal battery system 10d may be configured as described above, e.g., similar to thermal battery system 10c (e.g., as shown in FIGS. 4A and 4B and described above). In thermal battery system 10d, instead of delivering the second fluid from turbine 24 to steam turbine bottoming cycle system 38 (e.g., as shown for thermal battery system 10c in FIGS. 4A and 4B and described above), the second fluid from exhaust outlet 46 of turbine 24 is fed to steam-power plant 522. In some embodiments, for example, thermal battery system 10d is configured to supply both electricity to the electrical grid and thermal energy to steam-powered electrical generation system 522 to produce more electrical power therefrom.

Figure 5B:
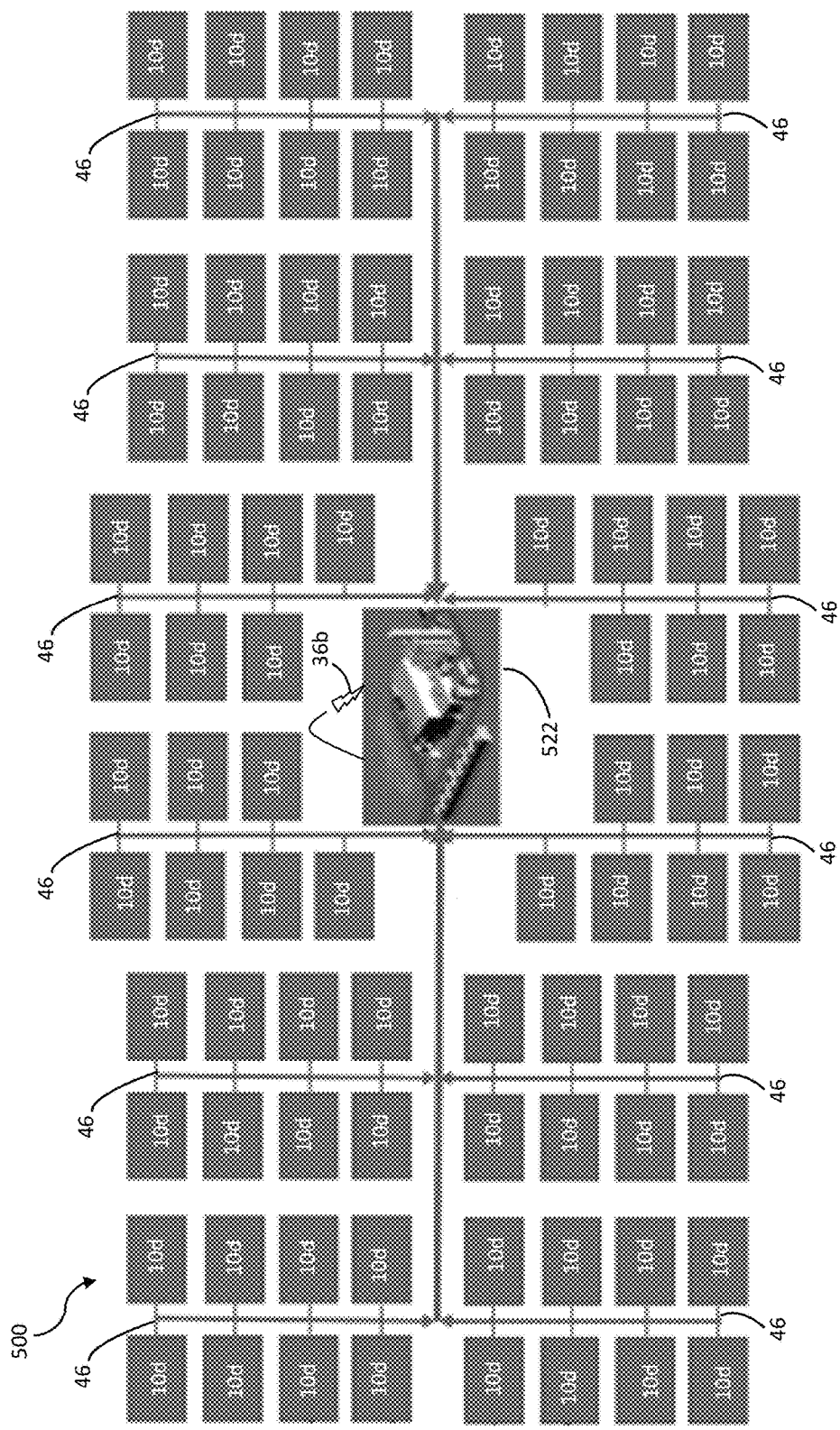
FIG. 5B shows, according to some embodiments, a schematic diagram of a steam power plant including a plurality of the thermal battery systems of FIG. 5A connected in parallel.

FIG. 5B shows a schematic diagram of a steam power plant. As shown in FIG. 5B, steam power plant 500 comprises an array of a plurality of thermal battery systems 10d, each thermal battery system 10d having its turbine exhaust stream being fluidically connected to steam power plant 522 via the pooled contents of exhaust outlets 46 of turbines 24 of the thermal battery systems 10d (e.g., as shown in FIG. 5A). Configuring the system in this way advantageously allows multiple thermal battery systems to supply sufficient thermal energy to power typically sized commercial coal-fired steam power plants, giving them new life with a clean energy source. In certain embodiments, steam power plant 500 is a recommissioned steam power plant.

Steam-powered electrical generation system 522 may, in some embodiments, comprise one or more steam boilers and steam turbines, similar to steam turbine bottoming cycle system 38 (e.g., as shown in FIGS. 4A and 4B and described above), but on a typically larger scale. Steam-powered electrical generation system 522 may comprise one or more electromagnetic generators, according to certain embodiments. In some embodiments, the steam boiler is configured to produce pressurized steam, which is used to drive the steam turbine to produce electrical power via the electromagnetic generator. Referring to FIGS. 5A and 5B, for example, steam-powered electrical generation system 522 may be configured to produce electrical power 36c.

According to certain embodiments, electrical power 36c may be delivered to an electrical power grid via power and/or transmission line 54d. In addition to generating electrical power 36c via steam-powered electrical generation system 522, each thermal battery system 10d may, in some embodiments, be configured to generate its own electrical power 36a via its gas turbine 24, which may be also be delivered to the electrical power grid, e.g., via power and/or transmission lines 54b as previously described.

As shown in FIG. 5B, the plurality of thermal battery systems 10d may be configured in parallel. The steam power plant may comprise any number of suitable thermal battery systems to build sufficient capacity to run the power plant. In some embodiments, for example, the steam power plant comprises greater than or equal to 10, greater than or equal to 20, greater than or equal to 30, greater than or equal to 40, greater than or equal to 50, greater than or equal to 60, greater than or equal to 70, greater than or equal to 80, greater than or equal to 90, or more thermal battery systems. In certain embodiments, the steam power plant comprises between 10 and 100 thermal battery systems, or between 40 and 60 thermal battery systems. Other ranges and values are also possible.

The steam powered electricity generation system 522 may have any of a variety of suitable steam-powered generating capacities. In some embodiments, for example, the steam powered electricity generation system 522 has a steam-powered generating capacity of at least at least 10 MW, at least 20 MW, at least 30 MW, at least 40 MW, at least 50 MW, at least 60 MW, at least 70 MW, at least 80 MW, or at least 90 MW. In certain embodiments, the steam power plant has a steam-powered generating capacity of between 10 MW and 100 MW, or between 400 MW and 60 MW. Other ranges and values are also possible.

In some embodiments, the steam power plant comprises a sufficient number of thermal battery systems to provide a combined thermal storage system capacity sufficient to produce an advantageously high amount of electricity. In certain embodiments, for example, the steam power plant comprises a sufficient number of thermal battery systems to provide a combined thermal storage system capacity sufficient to produce greater than or equal to 100 MWH, greater than or equal to 150 MWH, greater than or equal to 250 MWH, greater than or equal to 500 MWH, greater than or equal to 1000 MWH, greater than or equal to 2000 MWH, greater than or equal to 3000 MWH, greater than or equal to 4000 MWH, greater than or equal to 5000 MWH, greater than or equal to 6000 MWH, greater than or equal to 7000 MWH, greater than or equal to 8000 MWH, greater than or equal to 9000 MWH, greater than or equal to 10000 MWH, or greater than or equal to 11000 MWH over a period of at least 4 hours (e.g., 5-75 hours). In some embodiments, the steam power plant comprises a sufficient number of thermal battery systems to provide a combined thermal storage system capacity sufficient to produce between 100 MWH and 11500 MWH of electricity over a period of at least 4 hours (e.g., 5-75 hours), or between 4000 MWH and 6000 MWH of electricity over a period of at least 4 hours (e.g., 5-75 hours). Other ranges and values are also possible.

In some embodiments, the steam power plant comprises a sufficient number of thermal battery systems to provide an advantageously high combined electrical power generation capacity from the thermal battery systems and steam powered electrical generation system during discharge periods. In certain embodiments, for example, the combined electrical power generation capacity from the thermal battery systems and steam power generation of steam power plant 500 (steam power and cumulative thermal battery-generated power) during discharge is greater than or equal to 20 MW, greater than or equal to 50 MW, greater than or equal to 60 MW, greater than or equal to 70 MW, greater than or equal to 80 MW, greater than or equal to 90 MW, greater than or equal to 100 MW, greater than or equal to 110 MW, greater than or equal to 120 MW, greater than or equal to 130 MW, greater than or equal to 140 MW, greater than or equal to 150 MW, greater than or equal to 200 MW, greater than or equal to 500 MW, or greater than or equal to 1000 MW. In some embodiments, the combined electrical power generation capacity from the thermal battery systems and steam power generation of steam power plant system 500 (steam power and cumulative thermal battery-generated power) during discharge is between 20 MW and 1500 MW, or between 50 MW and 1000 MW, or between 90 MW and 150 MW. Other ranges and values are also possible. In one exemplary embodiment (e.g., as illustrated in FIG. 5B), the steam powered electricity generation system 522 has a steam-powered generating capacity of 50 MW, and is fed by 92 thermal battery systems 10*d*, each with a generating capacity of 1 MW, for a total capacity of steam power plant 500 of 142 MW.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A thermal battery system comprising:
an electric heater;
a thermal storage system;
a heat exchange system; and
an electricity generator,
wherein the electric heater is configured to be connected in electrical communication with an electric power source, and wherein the electric heater is configured to heat the thermal storage system;
wherein the thermal storage system is configured to store thermal energy from the electric heater during a charging mode of the thermal storage system, and heat a first fluid and provide the heated first fluid to the heat exchange system during a discharging mode of the thermal storage system, and
wherein the heat exchange system comprises at least a first heat exchanger and a second heat exchanger connected in series with respect to flow of the first fluid and the second fluid, wherein the heat exchange system is positioned downstream from the thermal storage system, and wherein the heat exchange system is configured to transfer heat from the heated first fluid to a second fluid,
wherein the electricity generator comprises at least one gas turbine and compressor, wherein the compressor is configured to supply the second fluid in a pressurized state to an inlet of the second heat exchanger, and wherein the turbine is positioned with an inlet in fluid communication with and downstream from an outlet of the first heat exchanger such that the heated second fluid in a pressurized state is discharged from an outlet of the second heat exchanger into an inlet of the first heat exchanger and discharged from the outlet of the first heat exchanger into the inlet of the turbine so that the turbine is able to generate electrical power therefrom.

2. The thermal battery system of claim 1, wherein the electric heater is physically separate from the thermal storage system.

3. The thermal battery system of claim 1, wherein the thermal storage system is in switchable valved fluidic communication with both the electric heater and the heat exchange system, wherein the thermal storage system is configured to receive the first fluid heated by the electric heater, store thermal energy from the first fluid heated by the electric heater by heating a thermal storage medium contained within the thermal storage system during the charging mode of the thermal storage system, and heat the first fluid and provide the heated first fluid to the heat exchange system during the discharging mode of the thermal storage system.

4. The thermal battery system of claim 1, wherein the electric power source comprises an electrical power grid.

5. The thermal battery system of claim 4, wherein the turbine is configured to be connected in electrical communication with the electric power grid to supply electrical power thereto.

6. The thermal battery system of claim 1, further comprising at least one steam turbine bottoming cycle system positioned in downstream fluidic communication with an exhaust outlet of the turbine.

7. The thermal battery system of claim 6, wherein the steam turbine bottoming cycle system comprises a steam turbine for generating electrical power.

8. The thermal battery system of claim 1, further comprising a combustor in fluidic communication and upstream of the heat exchange system able to provide supplemental heating of the first fluid.

9. The thermal battery system of claim 1, wherein the first fluid is air at a pressure between 0.9 atmospheres and 1.1 atmospheres.

10. The thermal battery system of claim 1, wherein the first fluid is air at ambient pressure.

11. The thermal battery system of claim 1, wherein the second fluid has a pressure between 2 atmospheres and 50 atmospheres.

12. The thermal battery system of claim 1, wherein the electric heater is able to heat the thermal storage system to a temperature between greater than or equal to 700° C. and less than or equal to 1300° C.

13. The thermal battery system of claim 1, wherein the electric heater is able to heat the thermal storage system to a temperature between greater than or equal to 950° C. and less than or equal to 1200° C.

14. The thermal battery system of claim 1, further comprising a first fluid blower positioned between and in fluidic communication with the thermal storage system and the electric heater.

15. The thermal battery system of claim 1, further comprising a second first fluid blower positioned downstream from an outlet of the second heat exchanger.

16. The thermal battery system of claim 1, wherein an exhaust outlet of the turbine is fluidically connected to an inlet of the thermal storage system, such that the second fluid at an exhaust pressure less than 2 atmospheres and a temperature between greater than or equal to 500° C. and less than or equal to 650° C. is recycled to the thermal storage system.

17. The thermal battery system of claim 1, wherein the thermal battery system has the ability to produce an electrical output during the discharging mode between 150 kW and 15 MW, and wherein the thermal battery system has a storage and delivery capacity sufficient to produce between 1.5 MWH and 115 MWH of electricity over a period of at least 4 hours.

18. A thermal battery system comprising:
a heat exchange system comprising at least a first heat exchange unit and a second heat exchange unit configured in series, the heat exchange system positioned downstream of an electric heater in electrical communication with an electric power source, wherein the heat exchange system is configured to transfer heat from a first fluid heated by the electric heater to a second fluid;
wherein the first heat exchanger and the second heat exchanger are in series with respect to flow of the first fluid and the second fluid;
a thermal storage system in switchable valved fluidic communication with both the electric heater and the heat exchange system, the thermal storage system configured to receive the first fluid heated by the electric heater, store thermal energy from the first fluid heated by the electric heater by heating a thermal storage medium contained within the thermal storage system during a charging mode of the thermal storage system, and heat the first fluid and provide the heated first fluid to the heat exchange system during a discharging mode of the thermal storage system; and
an electricity generator comprising a gas turbine and compressor, the compressor configured to supply the second fluid in a pressurized state to an inlet of the heat exchange system, and the turbine being positioned with an inlet in fluid communication with and downstream of an outlet of the heat exchange system discharging the second fluid in a pressurized state to the inlet of the turbine so that the turbine is able to generate electrical power therefrom.

\* \* \* \* \*